United States Patent
Ukani et al.

(10) Patent No.: US 6,249,890 B1
(45) Date of Patent: Jun. 19, 2001

(54) DETECTING HEAD READBACK RESPONSE DEGRADATION IN A DISC DRIVE

(75) Inventors: Anish A. Ukani, Oklahoma City; Karl L. Enarson, Yukon, both of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/201,605

(22) Filed: Nov. 30, 1998

Related U.S. Application Data

(60) Provisional application No. 60/088,080, filed on Jun. 5, 1998.

(51) Int. Cl.$^7$ ................................................. G06F 11/00
(52) U.S. Cl. ............................ 714/721; 360/53; 714/718
(58) Field of Search .................................. 714/721, 718; 369/54; 360/53, 31

(56) References Cited

U.S. PATENT DOCUMENTS

| | | |
|---|---|---|
| 5,001,714 | 3/1991 | Stark et al. . |
| 5,408,367 | 4/1995 | Emo . |
| 5,530,705 | 6/1996 | Malone, Sr. . |
| 5,557,183 | 9/1996 | Bates et al. . |
| 5,668,690 * | 9/1997 | Harrison ............................. 360/137 |
| 5,687,036 | 11/1997 | Kassab . |
| 5,696,445 | 12/1997 | Inbar . |
| 5,717,850 | 2/1998 | Apperley et al. . |
| 5,721,816 | 2/1998 | Kusbel et al. . |
| 5,737,519 | 4/1998 | Abdelnour et al. . |
| 5,923,876 * | 7/1999 | Teague ................................. 395/681 |
| 6,046,871 * | 4/2000 | Schaenzer et al. ..................... 360/31 |
| 6,078,455 * | 6/2000 | Enarson et al. ....................... 360/68 |
| 6,091,560 * | 7/2000 | Du ........................................ 360/53 |

\* cited by examiner

*Primary Examiner*—Phung M. Chung
(74) *Attorney, Agent, or Firm*—Crowe & Dunlevy

(57) ABSTRACT

Method and apparatus for predicting future failure of a disc drive head from degradation in a head readback response characteristic, such as electrical resistance, readback signal amplitude, asymmetry or nonlinearity. During manufacturing, the disc drive determines and store a baseline level for a selected readback response characteristic of the head indicative of head performance as data are read back from a disc. During subsequent data processing use, the disc drive subsequently periodically determines a subsequent level for the readback response characteristic of the head. The possibility of a future failure of the drive is next predicted in relation to a difference between the baseline level and the subsequent level for the readback response characteristic of the head. An indication of the possibility of the future failure is provided to allow a host device to reallocate data stored on the disc before the failure of the head.

35 Claims, 11 Drawing Sheets

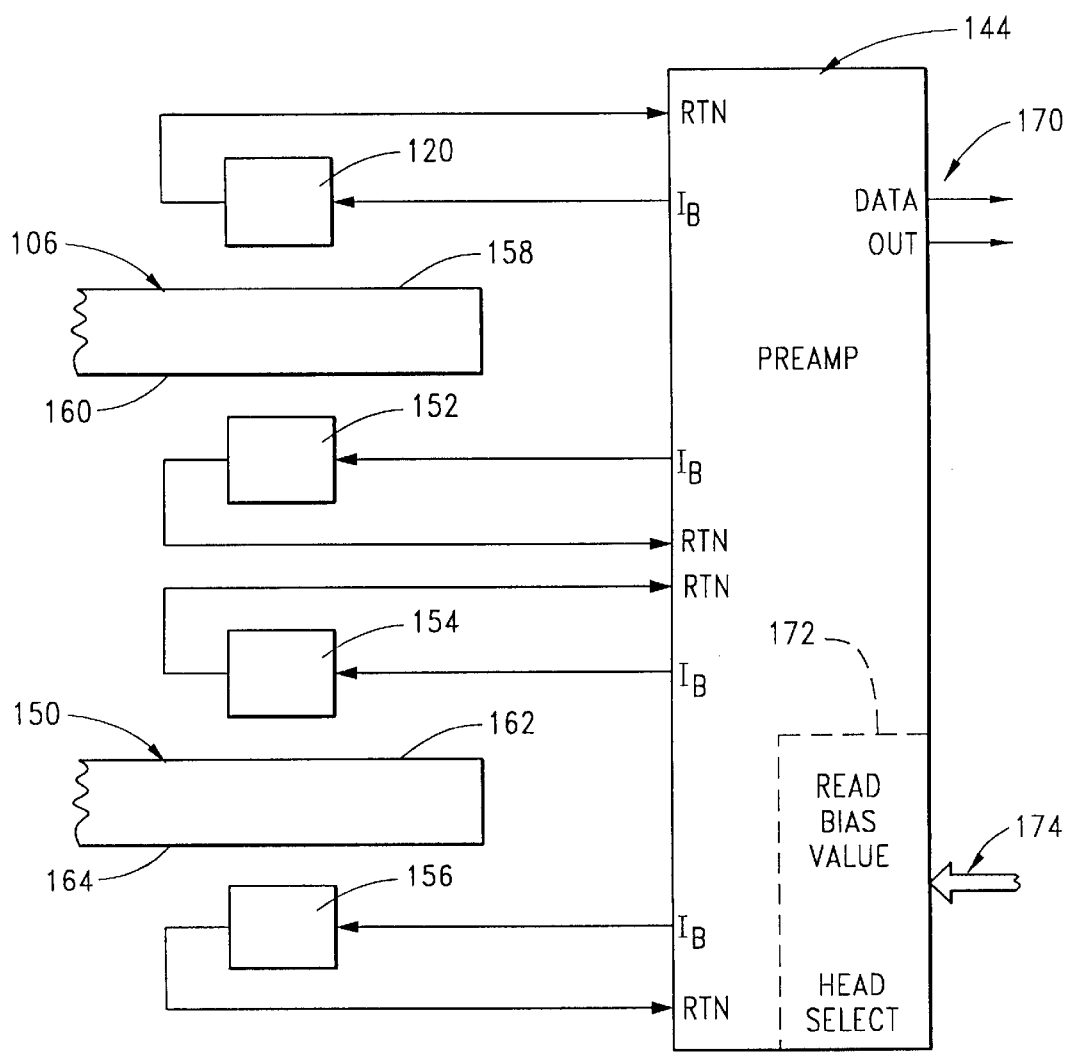
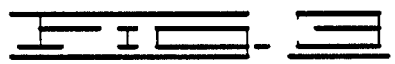
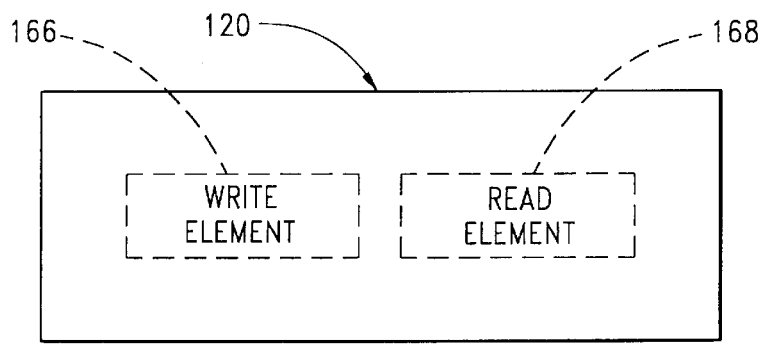
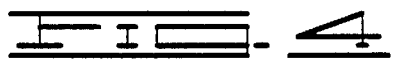
PRIOR ART

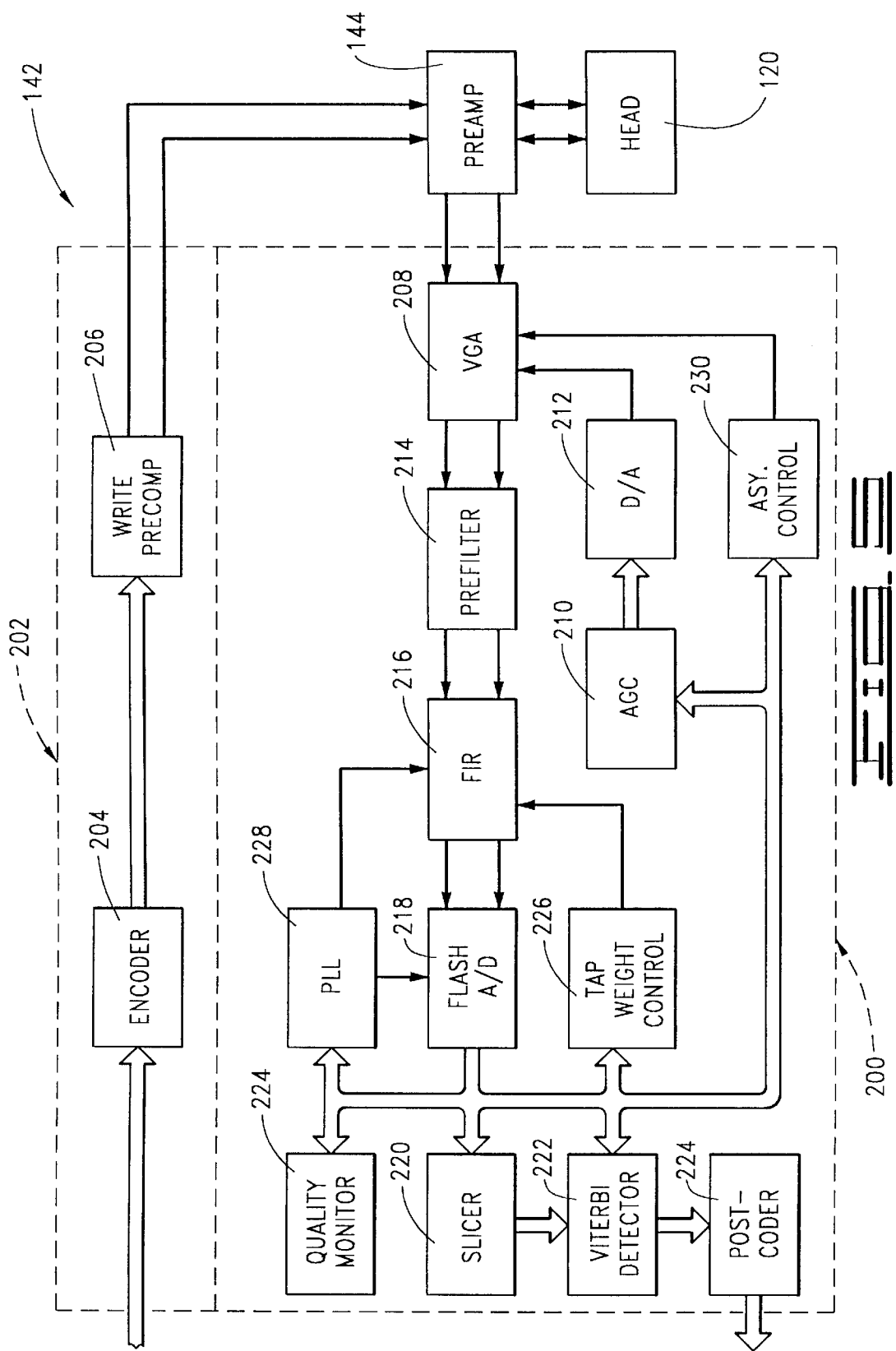

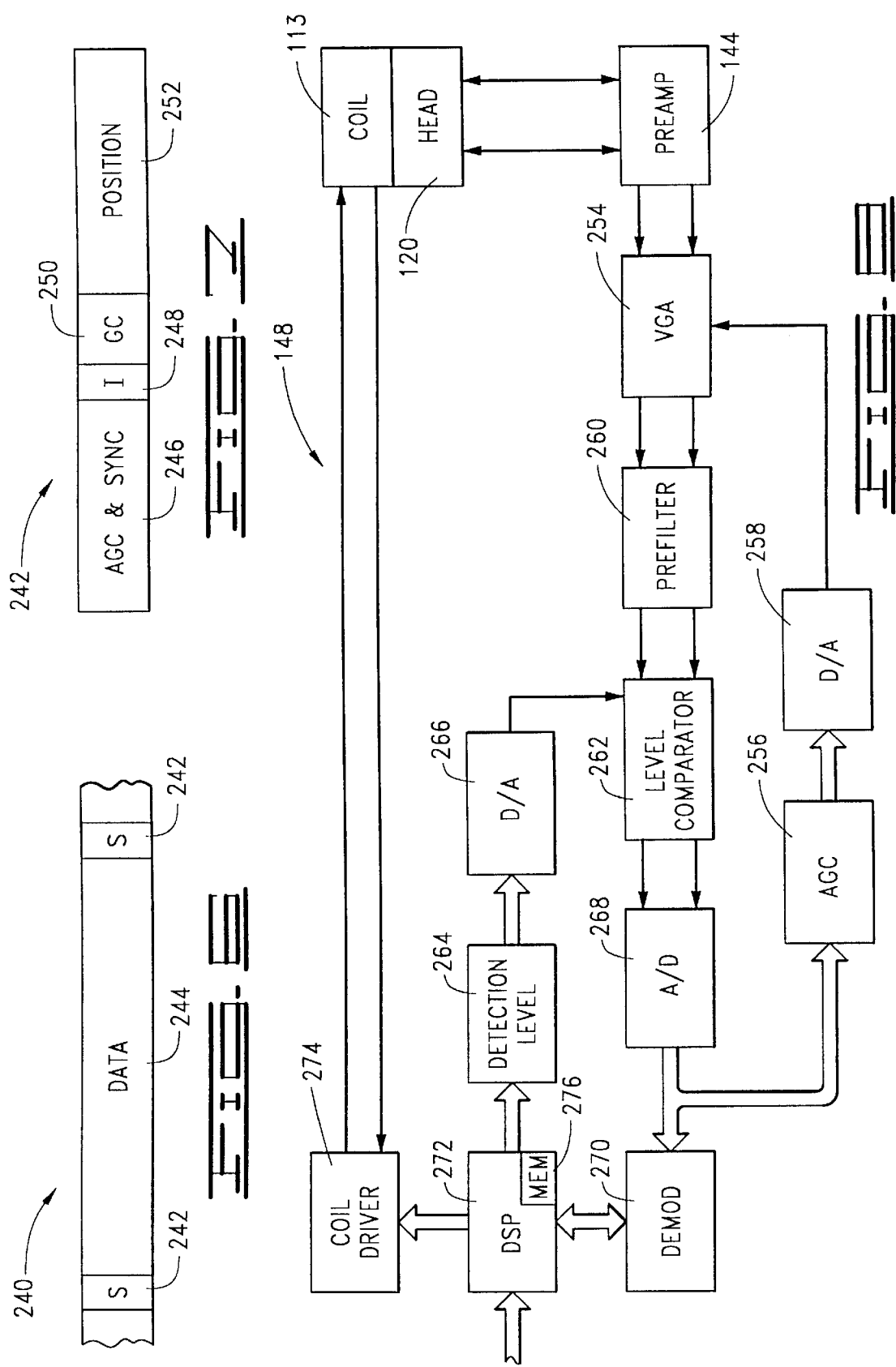

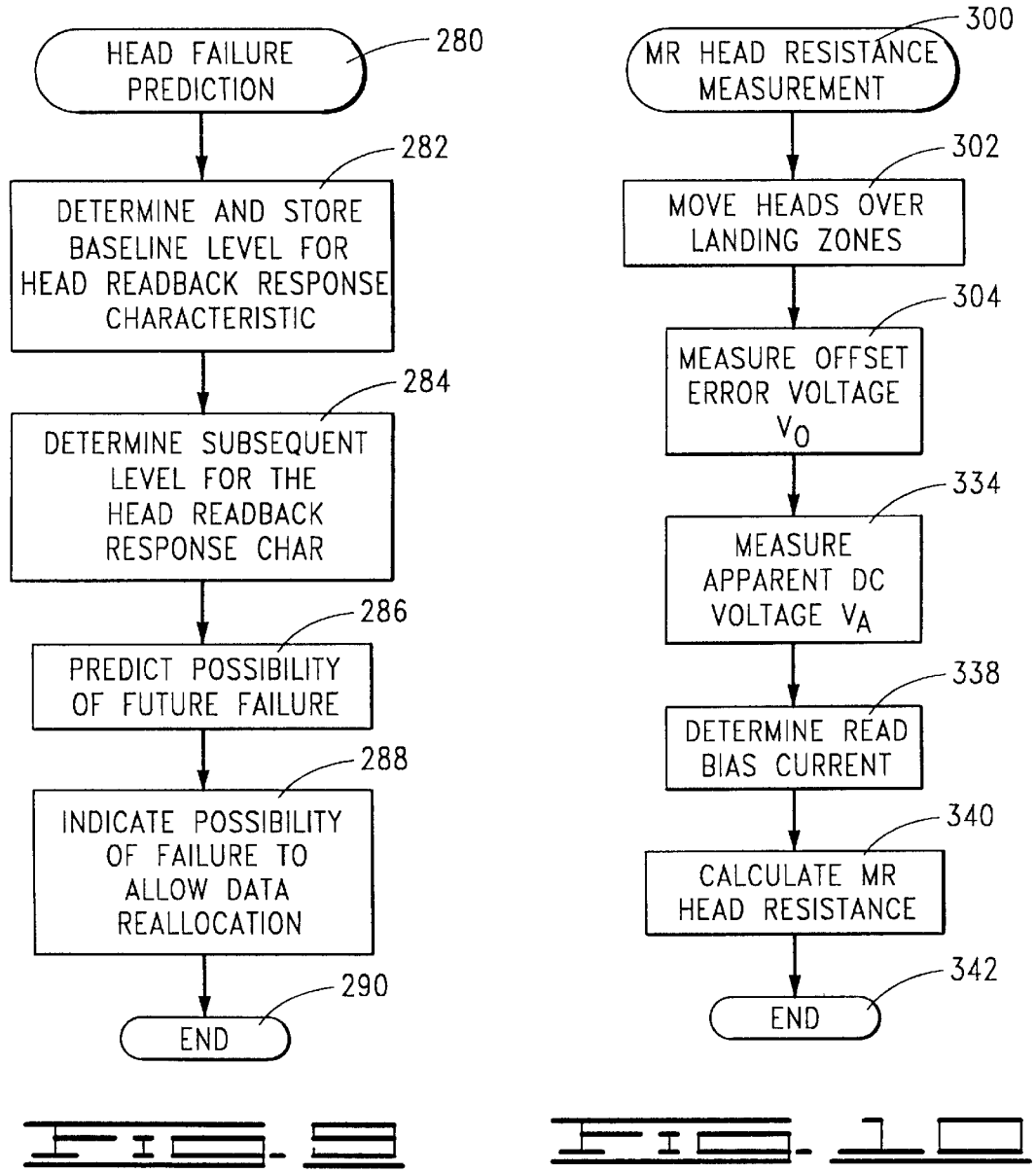

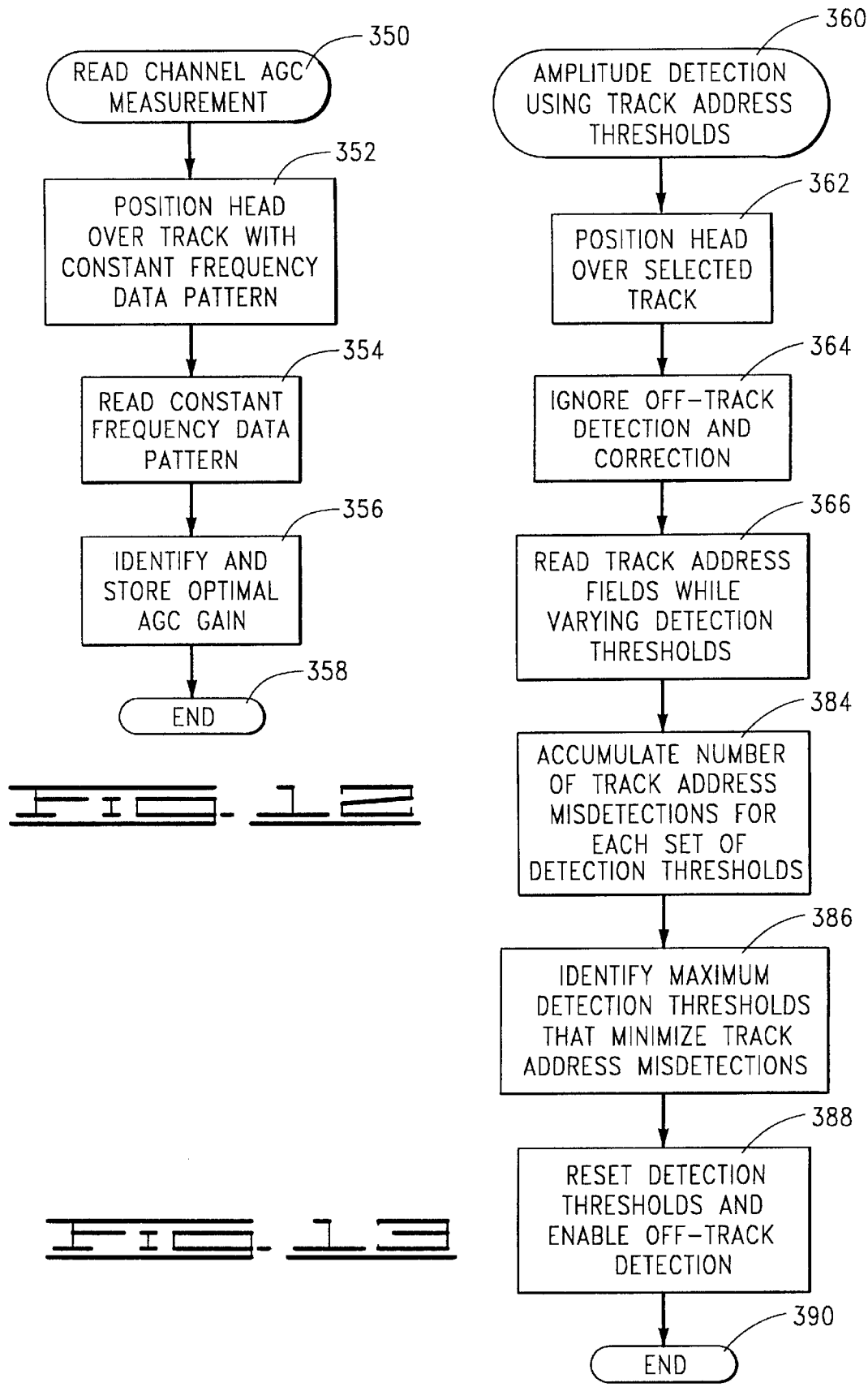

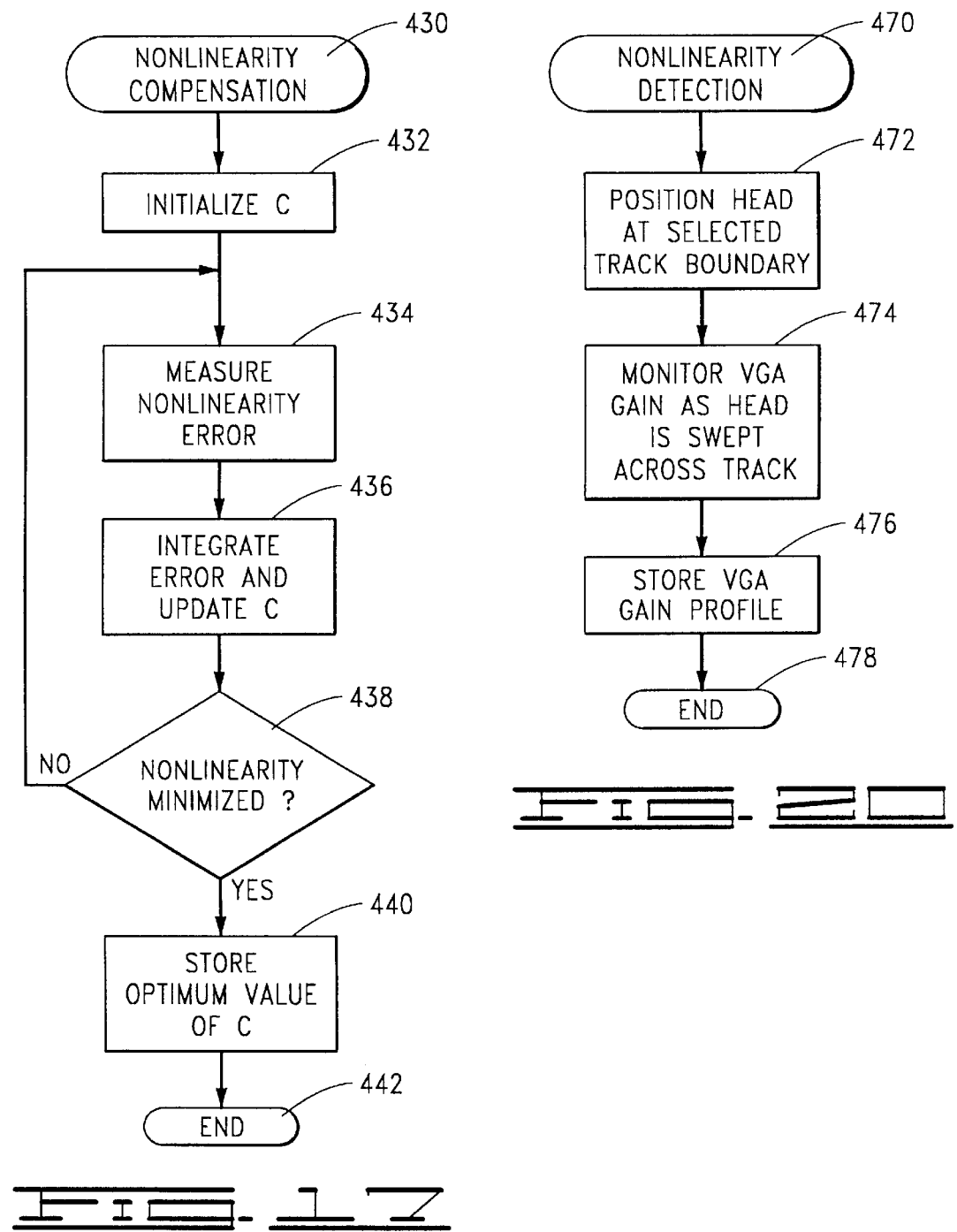

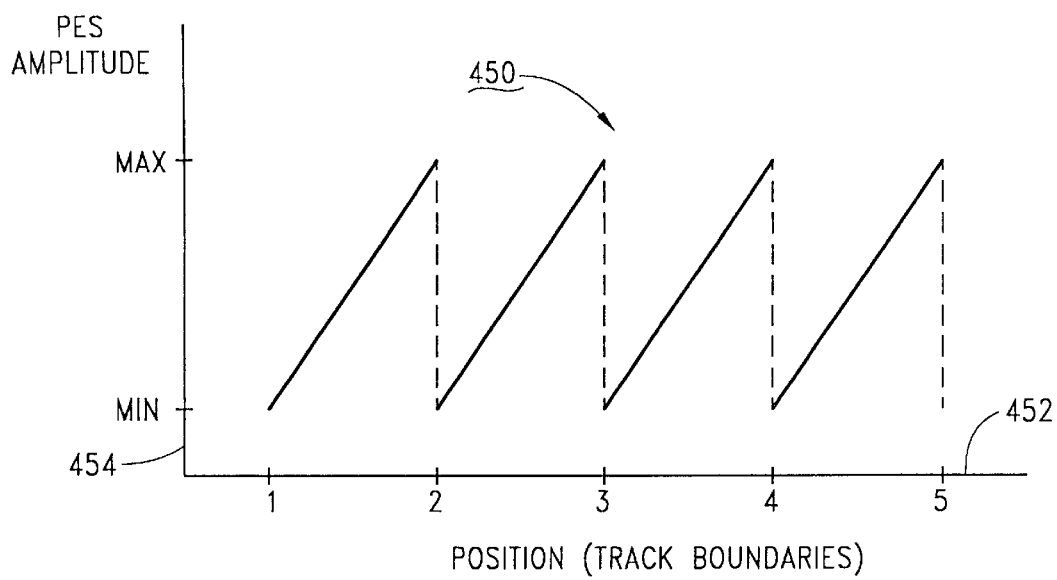
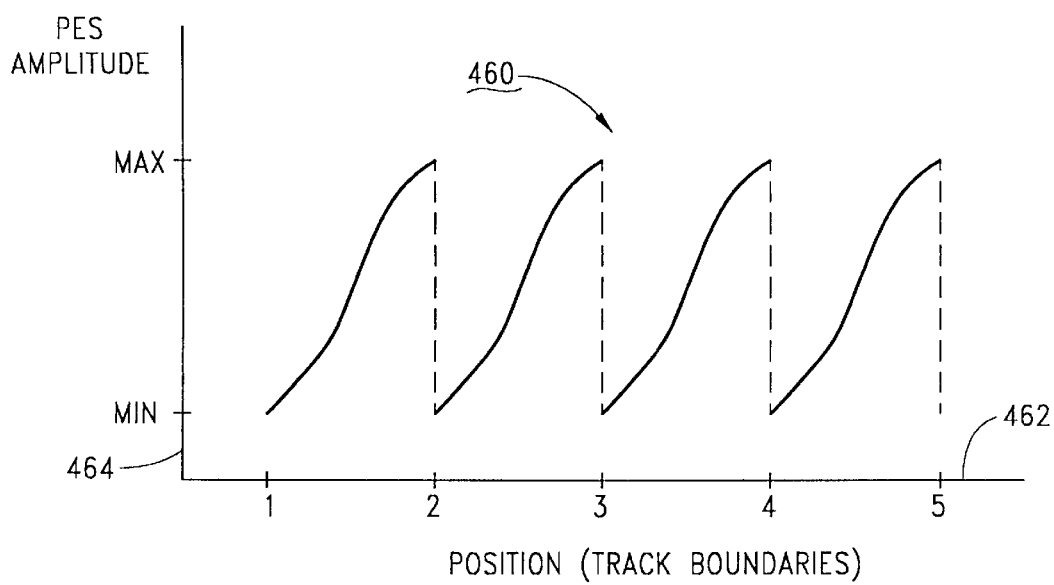

DETECTING HEAD READBACK RESPONSE DEGRADATION IN A DISC DRIVE

RELATED APPLICATIONS

This application claims the benefit of U.S. Provisional Application No. 60/088,080 entitled HEAD FAILURE PREDICTION BASED ON HEAD RESISTANCE CHANGE, filed Jun. 5, 1998.

FIELD OF THE INVENTION

The present invention relates generally to the field of disc drive data storage devices and more particularly, but without limitation, to a method and apparatus for predicting a future failure of a disc drive based upon degradation of head readback response characteristics.

BACKGROUND

Hard disc drives are used in modern computer systems and computer networks to enable users to quickly access vast amounts of electronically stored data. A typical disc drive houses five to ten magnetic discs which are axially aligned and mounted to a spindle motor for rotation at a constant, high speed. An array of read/write heads are controllably positioned adjacent magnetic recording surfaces of the discs in order to store and retrieve the data from tracks defined on the disc surfaces. The heads fly adjacent the recording surfaces on air bearings established by air currents set up by the rotation of the discs.

Of particular interest are heads of the so-called "magneto-resistive" variety, which utilize magneto-resistive (MR) elements to sense the selective magnetization of the tracks during disc drive data transfer operations. A typical MR element is formed from an alloy of materials so as to have a baseline electrical resistance which varies in the presence of a magnetic field of a selected orientation. By passing a bias current through the MR element, the selective magnetization of a corresponding track can be determined in relation to variations in voltage detected across the MR element.

It is common in present generation disc drive manufacturing processes to individually select read bias current magnitudes for each of the MR heads of a disc drive in order to optimize disc drive performance. For example, test data are typically written and then read in turn a number of times using a range of different read bias current magnitudes. Those read bias current magnitudes providing optimum performance are then stored in memory utilized by the drive so that, when a particular head is selected during subsequent operation, the disc drive applies the appropriate read bias current to the particular head.

MR heads are known to be delicate and must be handled and operated with a certain degree of care so as to prevent inadvertent damage which can degrade the reliability of the heads. Although the application of a relatively larger bias current will generally enhance the sensitivity of an MR head during a read operation by providing a higher signal to noise ratio in a recovered readback signal, it is important to ensure that the maximum power dissipation capability of the head is not exceeded. As will be recognized, because the MR element operates as a (highly sensitive) resistance, the power P dissipated by the MR element will be generally proportional to the resistance R of the MR element multiplied by the square of the bias current I (i.e., $P=I^2R$). Accordingly, there is an upper limit on the magnitude of the bias current that can be applied to any given MR head, and the application of too large a bias current, even momentarily, can stress the MR head and adversely affect its operational reliability over time.

Even if an MR head is not overstressed, the readback response characteristics of the MR head can still vary significantly over time due to a number of environmental and operational factors. Such readback response characteristics include nominal electrical resistance, as well as signal amplitude, asymmetry and linearity. Electrical resistance is the baseline direct current (dc) resistance of the read element, which will typically be from about 20 to 90 ohms ($\Omega$). Signal amplitude is a measure of the voltage range between maximum positive and negative peaks in the readback signal. Asymmetry is a measure of a difference between the absolute magnitudes of maximum positive and negative peaks in the readback signal, and linearity is a measure of higher-order response characteristics of the read element at positive or negative transitions in the readback signal. Each of these readback response characteristics affect the ability of an MR head to transduce data from a track.

Accordingly, there remains a continual need for improvements in the art whereby the reliability of a disc drive can be maintained by ensuring that head performance does not degrade to a level where previously stored data cannot be retrieved from a disc.

SUMMARY OF THE INVENTION

The present invention is directed to an apparatus and method for predicting disc drive failure due to head readback performance degradation.

As exemplified by presently preferred embodiments, a disc drive includes a controllably positionable head adjacent a rotatable storage disc for reading data from the disc, the head comprising a magneto-resistive element having a changed electrical resistance in the presence of a magnetic field of selected orientation.

The disc drive further comprises a read/write channel which transfers data between the disc and a host device associated with the disc drive. A servo circuit controls the position of the head relative to the disc, and a control processor provides top level control of the disc drive.

In predicting failure of the disc drive the drive determines and stores a baseline level for a readback response characteristic of the head indicative of head performance as data are read back from the disc. The drive next periodically determines a subsequent level for the readback response characteristic of the head. The drive predicts a possibility of a future failure of the disc drive in relation to a difference between the baseline level and the subsequent level or the readback response characteristic of the head. The drive then provides an indication of the possibility of the future failure to allow a host device with which the disc drive is associated to reallocate data stored on the disc before the failure of the disc drive.

In one preferred embodiment, the readback response characteristic comprises an electrical resistance of the head. Preferred approaches to predicting disc drive failure based on head resistance degradation include selecting a read bias current value and positioning the head sufficiently away from data stored on the disc so that the data do not affect the electrical resistance of the magneto-resistive element; measuring a voltage across the magneto-resistive element while applying the read bias current to the magneto-resistive element; determining the electrical resistance of the magneto-resistive element in relation to the voltage measured across the magneto-resistive element and the read bias current applied to the magneto-resistive element; and storing the electrical resistance and the applied read bias current.

In another preferred embodiment, the readback response characteristic comprises amplitude response of the head, determined as a function of a range between maximum and minimum voltage peaks in a readback signal generated by the head as data are read from the disc. One preferred approach to detecting amplitude response degradation involves monitoring gain used by a variable gain amplifier. Steps include positioning the head over a track on the disc having stored data arranged in a constant frequency data pattern; reading the constant frequency data pattern; selecting a gain for a variable gain amplifier that provides optimum response by the read channel in decoding data from the disc, the gain indicative of the amplitude response of the head; and storing the gain. Another preferred approach to detecting amplitude response degradation evaluates track address detection thresholds of the servo circuit, the detection thresholds used to decode track address information. Steps include positioning the head over a selected track; instructing the servo circuit to temporarily ignore indications that the head is no longer positioned over the selected track in response to errors obtained as the track address fields are read; reading the track address fields while sequentially varying amplitude detection thresholds used to detect peaks in a track address signal; and identifying maximum amplitude detection thresholds which minimize the occurrence of errors obtained as the track address fields are read.

In another preferred embodiment, the readback response characteristic comprises readback signal asymmetry of the head, characterized as a ratio between absolute magnitudes of positive and negative voltage peaks in a readback signal generated by the head as data are read from the disc. In a preferred approach, readback signal asymmetry degradation is evaluated by positioning the head over a selected track; instructing the servo circuit to temporarily ignore indications that the head is no longer positioned over the selected track in response to errors obtained as the track address fields are read; reading the track address fields while sequentially, independently varying positive and negative amplitude detection thresholds used to detect peaks in a track address signal; and identifying maximum positive and negative amplitude detection thresholds which minimize the occurrence of errors obtained as the track address fields are read.

In yet another preferred embodiment, the readback response characteristic of the head comprises readback signal nonlinearity of the head, characterized as high-order signal response at peak transitions in the readback signal. In one preferred approach, the variable gain amplifier is provided with a transfer function response in accordance with the relationship $VGA_{OUT}=A[VGA_{IN}+(C)VGA_{IN}^2]$ with $VGA_{OUT}$ an output signal of the variable gain amplifier, $VGA_{IN}$ an input signal applied to the variable gain amplifier, A the gain for the variable gain amplifier and C a compensation term selected to minimize nonlinearity. Steps include selecting an initial value for C; measuring an error signal indicative of nonlinearity error; integrating the error signal and adding the integrated error signal to C; repeating until an optimal value for C is obtained which minimizes the nonlinearity error; and storing the optimal value for C. In another preferred approach, steps to evaluate head readback nonlinearity include positioning the head at a boundary of a track having a width; monitoring the gain of the variable gain amplifier as the head is controllably positioned at selected intervals across the width of the track to establish a gain profile; and storing the gain profile.

These and various other features as well as advantages which characterize the present invention will be apparent from a reading of the following detailed description and a review of the associated drawings.

BRIEF DESCRIPTION OF THE DRAWINGS

FIG. 3 is a functional block diagram of the preamplifier circuit shown in FIG. 2, in conjunction with a plurality of heads and discs of the disc drive.

FIG. 4 is a general representation of the head shown in FIG. 2, which is a conventional magneto-resistive (MR) head having a thin-film write element and an MR read element.

FIG. 5 is a functional block diagram of the read/write channel of FIG. 2.

FIG. 6 illustrates the manner in which servo and user data are stored on tracks of the disc of FIG. 1.

FIG. 7 illustrates the configuration of a typical servo field from FIG. 6.

FIG. 8 is a functional block diagram of the servo circuit of FIG. 2.

FIG. 9 illustrates a HEAD FAILURE PREDICTION routine, carried out in accordance with a preferred embodiment of the present invention to predict the possibility of a future failure of the heads of the disc drive.

FIG. 10 illustrates an MR HEAD RESISTANCE MEASUREMENT routine, carried out in accordance with a preferred embodiment to detect degradations in MR head electrical resistance.

FIG. 12 illustrates a READ CHANNEL AGC MEASUREMENT routine, carried out in accordance with a preferred embodiment to detect degradations in head readback amplitude.

FIG. 13 illustrates an AMPLITUDE DETECTION USING TRACK ADDRESS THRESHOLDS routine carried out in accordance with another preferred embodiment to detect degradations in head readback amplitude.

FIG. 17 illustrates a NONLINEAR COMPENSATION routine carried out in accordance with a preferred embodiment to detect degradations in head readback nonlinearity response.

FIG. 18 provides a graphical illustration of a nominally linear position error signal (PES) generated by the servo circuit of FIG. 2 to control the position of a selected head with respect to a followed track.

FIG. 19 provides a graphical illustration of a nonlinear position error signal (PES) caused by head readback nonlinearity response.

FIG. 20 illustrates a NONLINEARITY DETECTION routine carried out in accordance with another preferred embodiment to detect degradations in head readback nonlinearity response.

DETAILED DISCUSSION

To provide a detailed discussion of presently preferred embodiments of the present invention, it will be helpful to first review the construction and operation of a disc drive in which the present invention can be advantageously practiced.

Overview of Disc Drive

Figure 1:
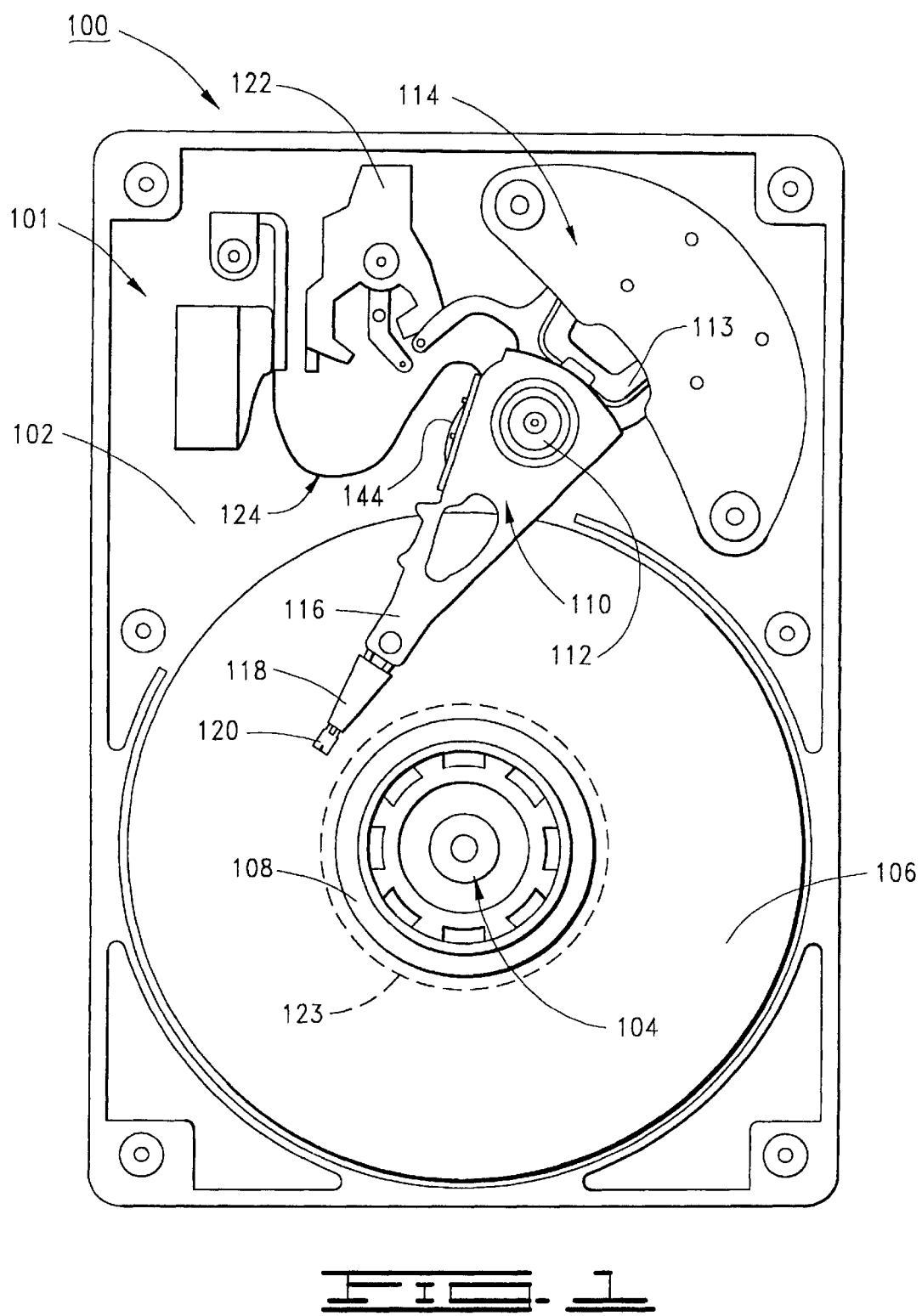
FIG. 1 provides a top plan view of a disc drive constructed in accordance with a preferred embodiment of the present invention.

FIG. 1 shows a disc drive 100 of the type used to store and retrieve computerized data. The disc drive 100 includes a head-disc assembly (HDA) 101 and a disc drive printed wiring assembly (PWA) which is mounted to the underside of the HDA 101 and thus, is not visible in FIG. 1. The PWA provides circuitry necessary to control the operation of the HDA 101 and to transfer data between the HDA 101 and a host computer in which the disc drive 100 can be mounted in a user environment.

The HDA 101 includes a base deck 102 to which various disc drive components are mounted. A top cover, which has been omitted from FIG. 1 to facilitate the present discussion, cooperates with the base deck 102 to form an internal, sealed environment for the disc drive 100. A spindle motor 104 is provided to rotate a stack of discs (the topmost of which is denoted at 106) at a constant high speed, with a disc clamp 108 securing the discs to the spindle motor 104.

To access the discs, a controllably positionable actuator assembly 110 is provided which rotates about a cartridge bearing assembly 112 in response to currents applied to a coil (a portion of which is shown at 113) of a voice coil motor (VCM) 114. The actuator assembly 110 includes a plurality of arms from which corresponding flexure assemblies extend, the topmost of which are identified at 116 and 118, respectively. Heads are provided at distal ends of the flexure assemblies and are supported over the discs by air bearings established by air currents set up by the rotation of the discs. The topmost head shown in FIG. 1 is denoted at 120.

A latch assembly 122 is provided to secure the heads over landing zones (denoted at 123) at the innermost diameters of the discs when the disc drive 100 is deactivated. A flex circuit assembly 124 provides electrical communication paths between the actuator assembly 110 and the disc drive PWA.

Figure 2:
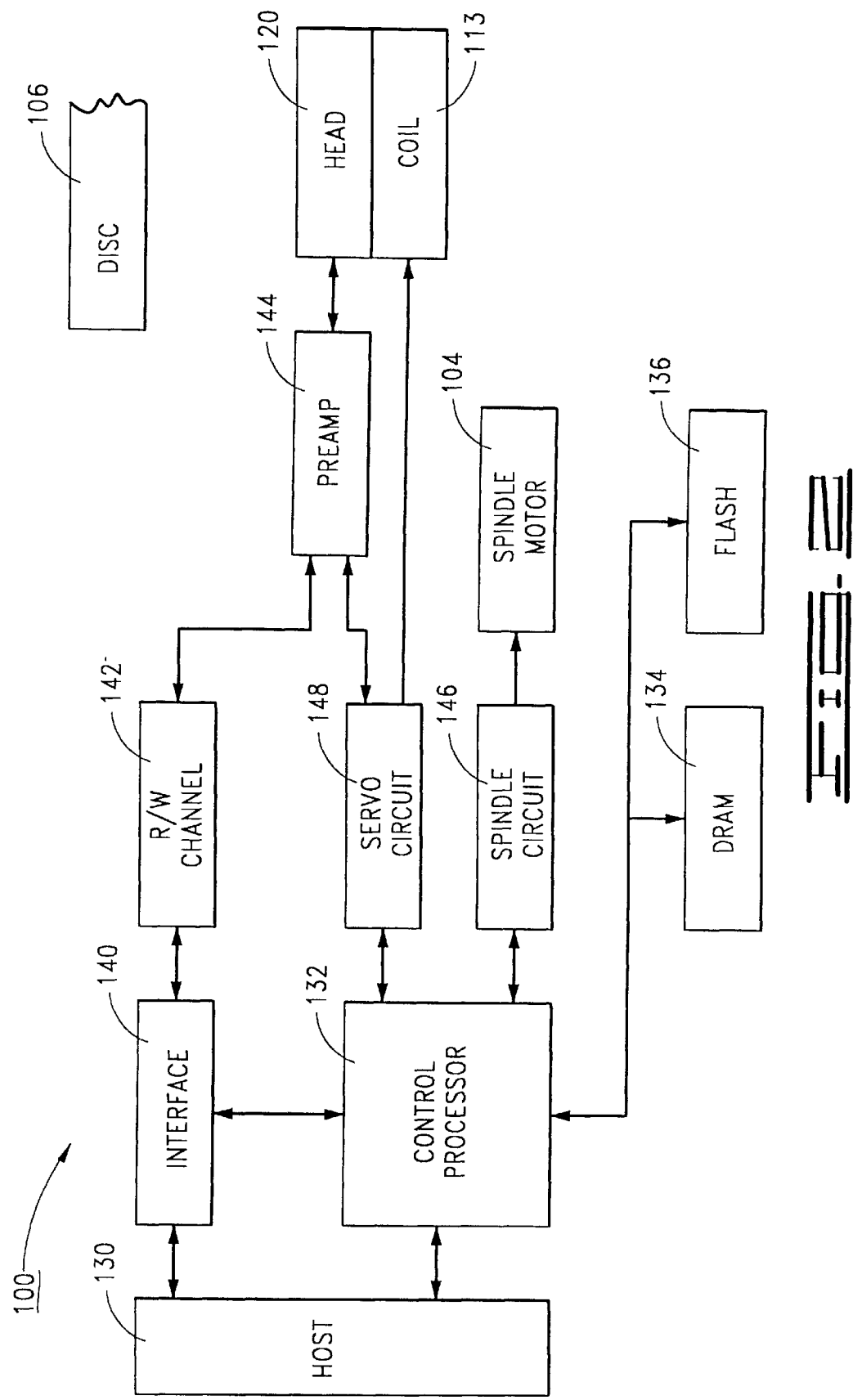
FIG. 2 is a functional block diagram of the disc drive of FIG. 1.

Referring now to FIG. 2, shown therein is a functional block diagram of the disc drive 100 of FIG. 1, in conjunction with a host computer 130 in which the disc drive 100 is contemplated as being mounted. The host computer 130 provides top level control of a disc drive control processor 132, which in turn controls the operation of the disc drive 100 in accordance with programming and parameter values stored in dynamic random access memory (DRAM) 134 and non-volatile flash memory 136.

Data to be stored by the disc drive 100 are transferred from the host computer 130 to an interface circuit 140, which includes a data buffer for temporarily buffering the data and a sequencer for directing the operation of a read/write channel 142 and a preamp/driver circuit 144 ("preamp") during data transfer operations. The preamp 144 is preferably mounted to the actuator assembly 110, as shown in FIG. 1.

A spindle circuit 146 controls the rotation of the disc 106 through back electromotive force (bemf) commutation of the spindle motor 104 (FIG. 1). A servo circuit 148 is provided to control the position of the head 120 relative to the disc 106 as part of a servo loop established by the head 120, the preamp 144, the servo circuit 148 and the coil 113. The servo circuit 148 includes a digital signal processor (DSP) and associated memory (not separately shown), and the control processor communicates with and controls the operation of the DSP in a manner such as generally set forth by U.S. Pat. No. 5,262,907 issued Nov. 16, 1993 to Duffy et al., assigned to the assignee of the present invention.

FIG. 3 provides a functional block diagram of the preamp 144 of FIG. 2, in conjunction with the topmost head 120 and disc 106 of FIG. 1. FIG. 3 further shows an additional disc 150 and additional heads 152, 154 and 156; it will be readily understood, however, that although two discs 106, 150 have been shown for purposes of the present discussion, the present invention is not so limited. The heads 120, 132 are supported adjacent recording surfaces 158, 160, of the to disc 106, and the heads 154, 156 are supported adjacent recording surfaces 162, 164 of the disc 150.

The heads 120, 152, 154, 156 are preferably characterized as magneto-resistive (MR) heads, with each head including a conventional thin film write element and MR read element, as generally represented in FIG. 4 at 166, 168 respectively for the head 120. Each MR read element of the disc drive 100 preferably comprises an alloy formed from cobalt, nickel and iron and possesses an electrical resistance that varies when subjected to a magnetic field of a selected orientation. To attain sensitivities necessary to support areal data densities of modern disc drives, each MR read element includes relatively thin boundary layers (typically measured in Angstroms) which are relatively delicate and sensitive to damage. It is thus desirable to hold the common mode potential of all of the MR read elements of each of the heads 120, 152, 154, 156 very closely to that of the discs 106, 150 in order to prevent head-disc electrical discharges (arcing), and to ensure that currents applied to the MR read elements do not exceed the current carrying capabilities of the elements.

Returning again to FIG. 3, as explained more fully below the preamp 144 is used during read and write operations of the disc drive 100 to access data stored on the recording surfaces 158, 160, 162, 164. In doing so, the preamp 144 selectively applies currents to the read and write elements of the heads 120, 152, 154, 156. The preamp 144 preferably incorporates a variety of additional features such as threshold detection, high frequency signal filtering and head selection capabilities as are generally known in the art; for reference, particularly suitable commercially available preamps include the V10594 from VTC, Inc., of Bloomington, Minn., USA, and the SSI 32R1590AR from Silicon Systems Inc., of Tustin, Calif., USA.

Of particular interest to the present discussion is the operation of the preamp 144 during a read operation, during which a read bias current of selected magnitude is continuously applied to the MR read element of the selected head 120, 152, 154, 156. Data stored on the associated recording surface are detected in relation to changes in voltage across the MR read element and reflected in a readback signal output by the preamp 144 to the read/write channel 142 (FIG. 2). In FIG. 3, the readback signal is shown to be transmitted along a DATA OUT path 170, which preferably comprises a pair of signal lines connected to a pair of differential output pins of the preamp 144 (not separately shown).

The magnitudes of the read bias currents (each identified generally as "$I_B$" in FIG. 3) are individually selected for each of the heads 120, 152, 154, 156 during disc drive manufacturing. More particularly, the read bias currents $I_B$ are preferably selected so as to optimize disc drive performance by, for example, writing a selected amount of test data to each of the recording surfaces 158, 160, 162, 164, reading back the data a number of times using a range of magnitudes for the read bias currents $I_B$, and selecting the final magnitudes for the read bias currents $I_B$ in relation to those magnitudes that provide the best read error rates (or other evaluation criteria). The range of magnitudes for the read bias currents $I_B$ are individually determined for each of the heads 120, 152, 154, 156 in a manner that will be discussed in greater detail below.

At this point, however, it will be noted that the magnitudes of the read bias currents $I_B$ are controlled in response to read bias values that are stored in flash memory 136 and sent by the control processor 132 (FIG. 2) to the preamp 144 by way of the DSP of the servo circuit 148. The read bias values are expressed in a multi-bit, digital form and loaded to a selected address of a register (represented by dotted block 172) of the preamp 144 by way of a serial interface path 174. In similar fashion, the various heads 120, 152, 154, 156 are individually selected in response to a multi-bit, digital head select value which is loaded into another address of the register 172 by way of the serial interface path 174. It will be understood that the serial interface path 174 preferably includes a data line along which the read bias and head select values are transmitted, as well as a clock line for supplying a clock to control the reading and writing of the register 172 and an enable line to enable register access. The preamp 144 is contemplated as accommodating up to 10 different heads and facilitating up to 32 different read bias current levels. Each update of the read bias value or the head select value occurs through the sequential clocking of the bits of a 16 bit word having one read/write command bit, seven address bits and eight data bits. The register 172 is thus updated with a new word upon receipt of the $16^{th}$ clock pulse.

During normal disc drive operation, one of the heads 120, 152, 154, 156 will be in a selected state (referred to herein as a "presently selected head" or "present head"). The preamp 144 will generally operate to continuously apply the appropriate read bias current to the presently selected head. For example, during a write mode of operation during which the presently selected head is used to write data to a selected track on the associated recording surface 158, 160, 162, 164, the data are written through the selective application of write currents by the preamp 144 to the write element (such as 166 of FIG. 4) of the presently selected head. However, the presently selected head also periodically reads data (such as servo or header information) from the associated recording surface during the write operation to enable the servo circuit 148 to control the position of the presently selected head, necessitating the continued application of the read bias current to the MR read element.

Likewise, the preamp 144 continuously applies the read bias current to the presently selected head during each read operation in order to retrieve the data from the associated recording surface. The actual reading and writing of data occurs while the selected track is followed by the presently selected head, although seeks from one track to the next can also be periodically performed, as a number of different tracks (and even from different recording surfaces 158, 160, 162, 164) can be accessed during a particular read or write operation. After the conclusion of each read and write operation, the servo circuit 148 (FIG. 2) generally operations to cause the presently selected head to continue following the last accessed track, until the next command is executed by the disc drive 100.

It is therefore desirable that the magnitudes of the read bias currents not exceed the power dissipation capabilities of the heads 120, 152, 154, 156, in order to prevent an inadvertent overbias condition which can adversely affect the operational reliability of the heads. Although the heads 120, 152, 154, 156 are fabricated so as to be nominally identical, process variations will typically result in different nominal resistances for the MR read elements of each head, leading to a different power dissipation capability for each head. Moreover, as discussed below the nominal resistances of the MR read elements can vary over time due to a variety of operational and environmental factors, making desirable the monitoring of these resistances to detect the possibility of a future failure of the disc drive 100.

FIG. 5 provides a block representation of the read/write channel 142 of FIG. 2, operably coupled to the preamp 144 and head 120 as shown. The read/write channel 142 includes a read channel 200 and a write channel 202. As will be recognized, disc drives typically utilize commercially available read/write channel integrated circuits. One particularly suitable read write channel integrated circuit is the MS151B KingCobra EPR4 PRML Read Channel, supplied by Lucent Technologies, Allentown, Pa., USA.

The write channel 202 encodes data to be stored to the discs 106, 150 with run-length and error correction code (ECC) encoding using an encoder circuit 204. The encoded data are then serialized and conditioned by a write precompensation circuit 206 to enable the preamp 144 to apply a sequence of write currents to the write element 166 (FIG. 4) of the head 120.

The read channel 200 recovers the data stored to the discs 106, 150 using a variable gain amplifier (VGA) 208 which maintains the amplitude range of the readback signals from the preamp 144 at an optimum level for processing by remaining portions of the read channel 200. The VGA 208 is responsive to a selectable gain provided by an automatic gain control (AGC) circuit 210 which establishes a gain value which is supplied to the VGA 208 by way of a digital to analog (D/A) converter 212.

A prefilter 214 applies frequency domain filtering to the output from the VGA 208 and a finite impulse response (FIR) filter 216 filters the signals to an approximation of a selected class of partial-response signaling, such as EPR-4. A flash analog-to-digital (A/D) converter 218 converts the resulting equalized signals to a sequence of digital values. A slicer 220 provides threshold data to enable a Viterbi detector 222 to detect the originally stored sequence of encoded data. A postcoder 224 removes the run-length limited encoding from the output sequence as well as other related functions (descrambling, clock gapping) and transmits the originally stored data (with ECC codes) to the interface circuit for error detection and correction and subsequent transfer to the host computer 130.

Additional circuits shown in FIG. 5 include a quality monitor 224 which establishes a quality measurement indicative of the optimization of the read channel. A tap weight control circuit 226 adaptively adjusts tap weights used by the FIR 216. A phase lock loop (PLL) 228 which provides read clock timing for the read channel 200. Finally, an asymmetry control block 230 provides compensation for asymmetric readback response by the head 120 by applying a compensation value to the VGA 208.

FIG. 6 illustrates the manner in which data are arranged on the discs. A portion of a track 240 is shown, with servo blocks 242 periodically interspersed with user data blocks 244. The servo blocks 242 are written during a servo-track writing (STW) process invoked during disc drive manufacturing. Data sectors are subsequently defined in the user data blocks 244 during a disc drive formatting operation, allowing the storage and retrieval of user data.

FIG. 7 shows the general format of one of the servo blocks 242 of FIG. 6. Included in each servo block 242 is an AGC & Sync field 246, an index field 248, a track address (Gray code, or "GC") field 250 and a position field 252.

The servo fields 242 are utilized by the servo circuit 148 to control the position of the heads 120, 152, 154, 156. A block diagram of the servo circuit 148 is provided in FIG. 8. The servo circuit 148 can be separately realized, or integrated into the read/write channel integrated circuit, as desired.

Readback servo signals are presented to a VGA block 254, which operates in response to a gain value established by an AGC circuit 256 (and transmitted by way of a D/A converter 258) from the AGC & Sync field 246. It will be apparent that combining the read/write channel 142 and the servo circuit 148 into the same integrated circuit allows elimination of duplicate circuits; however, for purposes of the present discussion separate VGA and AGC circuits have been shown in FIGS. 6 and 8.

A prefilter 260 applies preliminary frequency domain filtering and a level comparator 262 applies detection thresholds to the servo information read back from the servo fields 242 to detect the servo information. The detection thresholds are provided by a detection level circuit 264 (and a D/A 266). The output of the level comparator 262 is converted to digital form by A/D 268 and demodulated by a demodulator circuit 270, thereby providing a digital signal processor (DSP) 272 with digital representations of the servo information from the servo fields 242. The DSP 272 controls the position of the head 120 by generating a position error signal (PES) from the position field 252 (FIG. 7) and applies a current correction signal to a coil driver 274 to minimize head position error. The DSP 272 further controls the detection levels output by the detection level circuit 264 to decode the index (angular position) and the GC (track address) fields 248, 250 (FIG. 7). Programming used by the DSP 272 is stored in DSP memory (MEM) 276.

Head Failure Prediction

Having concluded an overview of relevant aspects of the disc drive 100, the general manner in which the disc drive 100 operates to predict head failure based upon changes in head readback response characteristics will now be discussed. Considerations for specific types of readback response characteristics, such as electrical resistance, amplitude, asymmetry and linearity will follow.

Referring to FIG. 9, shown therein is a flow chart for a HEAD FAILURE PREDICTION routine 280, generally representative of programmino stored in flash memory 136 and utilized by the control processor 132 (FIG. 2).

At block 282, the routine first determines and stores a baseline level for the selected head readback response characteristic, indicative of the operational performance of each head (120, 152, 154, 156) in reading back data from the discs 106, 150. Preferably, block 282 is carried out during disc drive manufacturing.

Block 284 next shows that a subsequent level for the selected head readback response characteristic is obtained. Block 284 is preferably carried out during data processing use of the disc drive 100, either during a power-up routine or during idle periods when the disc drive is operational, but not actively transferring data between the discs 106, 150 and the host computer 130. It will be recognized that the block 284 is preferably carried out on a periodic basis and that the subsequent levels of the readback response characteristics can be stored each time that block 284 is performed.

The possibility of a future failure of the disc drive 100 is next predicted by block 286, based upon the baseline level and the subsequent level or levels obtained for the selected head readback response characteristic. As discussed below, the operation of block 286 can include calculation of the difference between successive level measurements and comparison of this difference to an empirically determined threshold, or a review of the rate of change in successive levels obtained from block 284 in view of empirically determined rates.

Finally, when the operation of block 286 indicates that there is a sufficient possibility that a future failure of the disc drive 100 will likely occur based upon detected operational degradation of a selected head, block 288 issues an indication to a host device (such as the host computer 130) to allow the host device to take appropriate remedial actions. Such actions can include the deallocation of all of the data sectors on the data surface associated with the degraded head (and transfer of this data to "good" data surfaces in the drive). The indication provided by block 288 can also allow a system administrator to backup the data stored by the disc drive and replace the entire disc drive with a new unit. Such operation can be highly desirable in a multi-drive array (such as a Redundant Array of Inexpensive Discs, or "RAID").

The routine is then shown to end at block 290, but it will be understood from the foregoing discussion that the routine can be desirably configured to continue in a loop at blocks 284 and 286, with the disc drive determining a subsequent level at appropriately times (such as at start-up, every 30 minutes of operation, during idle periods, etc.).

Head Resistance Degradation Detection

Considerations relating to degradations in head resistance will now be discussed. As discussed above, an MR head relies upon changes in electrical resistance of its MR read element (168, FIG. 4) to obtain a readback signal indicative of the selective magnetization of a particular track. Hence, changes in the resistive response of an MR head can be used to predict the subsequent failure of the head.

Some preamps provide the capability of providing a direct measurement of MR read element resistance, such as the above mentioned SSI 32R1590AR. Accordingly, this capability can be utilized in accordance with the flow chart of FIG. 9 to allow detection of head resistance degradation. That is, the head resistance can be measured both during manufacturing (block 282, FIG. 9) and periodically during subsequent data processing use of the drive (block 284, FIG. 9), and the possibility of future failures can be predicted and indicated accordingly (blocks 286, 288, FIG. 9).

Another preferred embodiment for monitoring changes in electrical resistance of the MR element of the heads is discussed with reference to FIG. 10. Particularly, FIG. 10 shows an MR HEAD RESISTANCE MEASUREMENT routine 300, representative of programming stored in flash memory 136 and utilized by the control processor 132.

As shown at block 302, the heads 120, 152, 154, 156 are initially moved over the landing zones associated with each of the heads (such as the landing zone 123 shown in FIG. 1 for the head 120). As will be recognized, the landing zones are texturized locations on the discs 106, 150 where the heads 120, 152, 154, 156 are normally brought to rest (i.e., parked) when the disc drive 100 is deactivated. It will be noted that, unlike a normal parking operation wherein the heads are brought to rest on the landing zones, during the routine of FIG. 10, the spindle circuit 146 (FIG. 2) continues to rotate the spindle motor 104 so that the heads are flown over the landing zones and are not brought to rest thereupon.

Because the landing zones are disposed beyond the recording surfaces 158, 160, 162, 164 and are therefore not magnetized, the heads will not be subjected to magnetic fields sufficient to interfere with the operation of remaining portions of the routine of FIG. 10. The actuator assembly 110 (FIG. 1) can be latched in place using the latch assembly 122, as desired, in order to maintain the heads 120, 152, 154, 156 over the landing zones. It is contemplated that the heads can be alternatively positioned over some other non-recorded portion of the discs 106, 150, so long as the heads are not subjected to magnetic fields from data previously stored to the discs.

It is preferable to fly the heads 120, 152, 154, 156 so as to prevent the possibility of electrically conducting current between the heads and the discs 106, 150. However, in disc drives utilizing ramps to load and unload the heads, it is contemplated that the heads might be parked on the ramps in lieu of flying the heads over non-magnetically recorded portions of the discs, provided the head and ramp configurations prevent the conduction of current from the heads to the ramps. Of course, if the heads are parked on ramps, it may not be necessary to rotate the discs, depending upon the configuration of the drive.

Once the heads 120, 152, 154, 156 are positioned so as to be flown over the landing zones, the routine of FIG. 10 next operates at block 304 to measure a differential offset error voltage $V_O$ across each MR read element of each of the heads. This is preferably accomplished by, for each head in turn, applying a read bias current of selected magnitude to the associated MR read element and measuring the voltage at the data out pins of the preamp 144 (i.e., from the path 170 of FIG. 3). Because the heads 120, 152, 154, 156 are positioned so as to be isolated from the effects of magnetically recorded data, the voltage measured by the preamp 144 should nominally be zero volts. However, due to electrical offsets provided primarily by the preamp 144, in many cases the offset error voltage $V_O$ will be a non-zero value.

Figure 11:
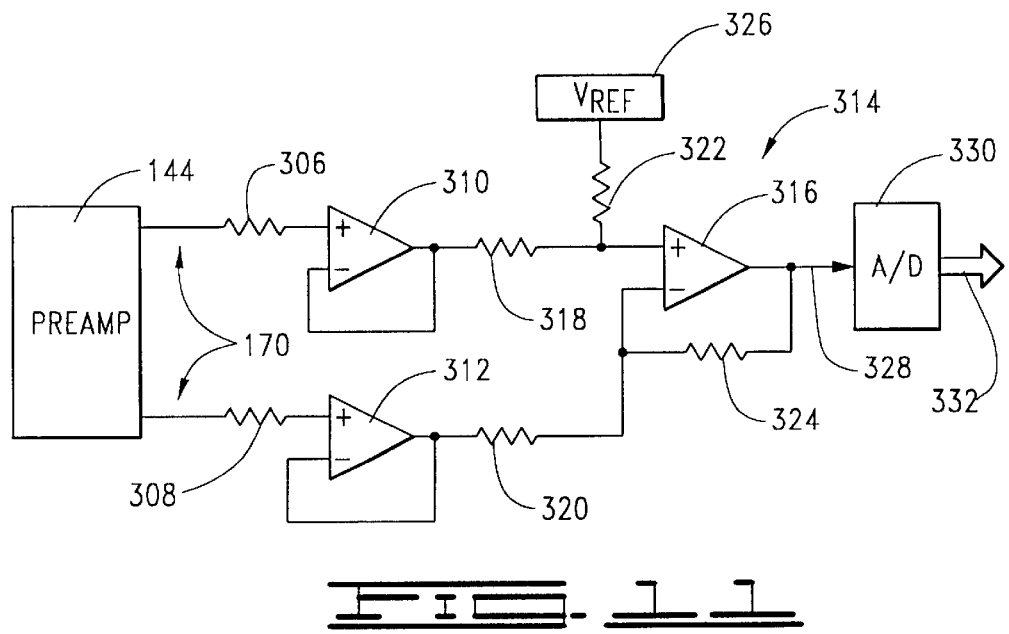
FIG. 11 provides a schematic representation of a circuit used during the implementation of the routine of FIG. 10 in accordance with a preferred embodiment.

The manner in which the offset error voltage $V_O$ is measured by block 304 can be more fully understood by a review of FIG. 11, which provides a functional schematic diagram of a portion of the disc drive 100 specifically provided for use during the operation of the routine of FIG. 10. It will be readily understood that the circuit set forth by FIG. 11 is switched in during the operation of the routine of FIG. 10, and is therefore not utilized during normal operation of the disc drive 100.

With reference to FIG. 11, during the operation of block 304 of FIG. 10, the preamp 144 applies the selected read bias current to the selected MR read element (which will be considered to be the MR read element 168 of the head 120, as previously shown in FIG. 4) and outputs the voltage detected across the MR read element 168 on the differential output path 170.

Each of the individual signal paths of 170 are operably coupled to a serially connected resistor (denoted at 306, 308, respectively), which in turn are operably coupled to a pair of high input, unity gain buffers 310, 312. For reference, the buffers 310, 312 are commercially available in a single package as the TLC27M7 CMOS DUAL OPERATIONAL AMPLIFIER, Texas Instruments, Dallas, Tex., USA. The buffers 310, 312 serve to isolate the preamp 144 from remaining portions of the circuit of FIG. 11 and provide reasonable bandwidth and high input impedance. The resistors 306, 308 provide capacitive isolation for the buffers and are preferably rated at 100 kilo-ohms (kohms) each.

The buffers 310, 312 are operably coupled to a conventional differential amplifier circuit 314, comprising an operational amplifier 316 and resistors 318, 320, 322 and 324. For reference, the resistors 318, 320 are preferably rated at 9 kohms each and the resistors 322, 324 are preferably rated at 8 kohms each. A suitable reference voltage $V_{REF}$ of 2.2 volts is supplied by a reference voltage source 326.

The output from the differential amplifier circuit 314 is provided on path 328 as a voltage indicative of the differential voltage output by the preamp 144 on the signal paths of 170, and provided as an input to an analog-to-digital (A/D) converter 330. The A/D 330 converts the input voltage to digital form and outputs the same on digital path 332, which can thereafter be accessed by the control processor 132 of FIG. 2.

Referring back to FIG. 10, the operation of block 304 utilizes the circuit of FIG. 11 to obtain the offset error voltage $V_O$ values for each of the heads 120, 152, 154, 156 in turn. Preferably, multiple measurements are made for each of the heads and these multiple measurements are averaged to obtain a final $V_O$ value for each of the heads.

The routine of FIG. 10 then passes from block 304 to block 334, wherein the disc drive 100 measures an apparent direct current (DC) voltage $V_A$ for each of the heads 120, 152, 154, 156. The same selected bias current is again applied to each of the heads 120, 152, 154, 156 in turn, but this time the preamp 144 is operated in a selectable "test" mode so that high frequency components (sometimes referred to as alternating current, or AC components) are removed from the differential voltage expressed at the signal paths of 170. That is, block 334 operates to filter out AC components from the voltage across each of the MR read elements, so as to provide just the DC voltage thereacross. The apparent DC voltage $V_A$ is determined for each of the heads 120, 152, 154, 156 using the circuit of FIG. 11, as discussed above, so that digitally expressed values for the voltages are available to the control processor 132.

It will be noted that the voltages obtained by the operation of block 334 are identified as "apparent" DC voltages, in that the offset error voltage $V_O$, introduced primarily by the operation of the preamp 144, will still be present, and therefore should be subtracted out to determine an actual DC voltage, as explained below. However, other commercially available preamplifiers have the capability of providing the actual DC voltage across an MR read element directly, without the necessity of separately determining an offset error and an apparent DC voltage as set forth by the flow of FIG. 10.

Once the apparent DC voltage $V_A$ has been determined for each of the heads 120, 152, 154, 156, the routine of FIG. 10 passes from block 334 to block 338, wherein the routine determines a maximum read bias current that can be applied to each of the heads 120, 152, 154, 156. Although a maximum read bias current does not necessarily have to be determined, the maximum read bias current will generally provide better resolution of the resistance of the MR read element. This is accomplished by identifying the maximum current that satisfies the following relationship:

$$P_{RATED} \geq (V_A - V_O) I_{ACTUAL}^K \qquad (1)$$

where $P_{RATED}$ is the specified maximum power dissipation rating of the MR read elements of the heads (such as 5.2 milliwatts), $V_A$ is the apparent DC voltage determined by block 334 for each of the heads, $V_O$ is the offset error voltage determined by block 304 for each of the heads, k is a derating factor (such as 0.9) used to provide a derating margin to account for measurement inaccuracies, and $I_{ACTUAL}$ is the magnitude of the bias currents applied to obtain the respective $V_A$ and $V_O$ voltages. Thus, the largest $I_{ACTUAL}$ bias current that yields a power dissipation value that is just equal to or less than the rated power $P_{RATED}$ is identified as the maximum read bias current. Of course, this current will likely be different for each of the MR read elements of each of the heads 120, 152, 154, 156, due to variations in nominal resistance therebetween.

Once the maximum read bias current is identified by block 338, the routine of FIG. 10 passes to block 340 wherein the nominal head resistance of the MR read element ("$R_{MR}$") is calculated as follows:

$$R_{MR} = \frac{(V_A - V_O)}{I_{ACTUAL}} \qquad (2)$$

from the corresponding values for $V_A$, $V_O$ and $I_{ACTUAL}$ best satisfying equation (1) (i.e., providing a value as close as possible to, without exceeding, $P_{RATED}$). This resistance is stored by block 340, after which the routine ends at block 342.

It will be appreciated that the routine of FIG. 10 is preferably performed for each head during manufacturing of the disc drive 100 and the resulting bias current and resistance for each head are stored in an appropriate location (such as in a table in flash memory 136 or on an available non-data track on one of the discs 106, 150). These values correspond to the baseline level for the head readback response characteristic of block 282 discussed above with reference to FIG. 9. Thereafter, at selected times the bias current is then reapplied to the corresponding head and new head resistance values are obtained, which correspond to the subsequent level for the head readback response characteristic of block 284 of FIG. 9.

In this way, significant departures over time in the nominal resistance of the MR head can be readily observed. Based on empirical tests, either appropriate thresholds can be applied to the difference between the baseline and subsequent head resistance measurements to predict future head failure, and/or the rates of change in subsequent resistance measurements can be used to predict said future failures of the heads. It is contemplated that, as desired, temperature related effects can be minimized through correlation with a separate temperature sensor (not shown), allowing resistance variations resulting from changes in temperature can be readily detected and canceled.

Head Readback Amplitude Degradation

Another head readback response characteristic that can be advantageously monitored to predict future failure of the heads 120, 152, 154, 156 is head readback amplitude. As discussed above, readback amplitude is expressed as a function of the range between maximum and minimum voltage peaks in a readback signal generated by the head as data are read from the disc (i.e., the peak-to-peak voltage response range of the head).

In one preferred embodiment for detecting head readback amplitude degradation, the disc drive 100 evaluates changes in gain established by the AGC 210 and utilized by the VGA 208 (FIG. 5). This is based on the generally inverse correlation between the peak-to-peak amplitude of the readback signals generated by the head (120, 152, 154, 156) and the gain used by the VGA 208; as the peak-to-peak amplitude increases, the gain generally decreases, and vice-versa. Accordingly, the disc drive 100 carries out a READ CHANNEL AGC MEASUREMENT routine 350 set forth by FIG. 12. The routine of FIG. 12 is representative of programming stored in flash memory 136 and utilized by the control processor 132 to evaluate each of the heads (120, 152, 154, 156) in the disc drive 100 in turn.

As shown by block 352, the routine first positions the selected head over a track on the disc having stored data arranged in a constant frequency data pattern. Preferably, the data are arranged in a 6T pattern (i.e., repetitively occurring sets of six+1 bits followed by six −1 bits) on a service track not used by the disc drive 100 for storage of user data. It will be noted that the service track is otherwise similar to the track 240 shown in FIG. 6, so that the 6T pattern is written to the user data fields 244, and the servo circuit 148 uses the periodically interspersed servo fields 242 to maintain the head nominally over the center of the service track.

Once the selected head is over the service track, the constant frequency data pattern is read by the head, as shown by block 354 in FIG. 12. As the pattern is read, a baseline gain for the VGA 208 is selected, block 356, through normal operation of the AGC 210 in responding to the readback signals presented to the read channel 200. The gain that best optimizes the operational performance of the read channel 200 is thereafter identified and stored, as indicated by block 356, after which the routine ends at block 358.

With reference to the routines of FIGS. 9 and 12, during disc drive manufacturing the first gain value (baseline level for head readback response characteristic) is obtained and stored; that is, block 282 of FIG. 9 comprises operation of the routine of FIG. 12 during manufacturing. Thereafter, at appropriate times during data processing use of the disc drive 100 (such as during a startup routine, idle period, etc.), the routine of FIG. 12 is subsequently performed to obtain subsequent levels of the gain (head readback response characteristic), as indicated by block 284 of FIG. 9. At such time that a difference between a subsequently determined gain exceeds an empirically determined threshold, or when the rate of change over time in the AGC gain is detected, the disc drive 100 proceeds to predict a future failure of the disc drive and alerts the host computer 130 to take appropriate action.

However, the foregoing embodiment is not the only way in which the amplitude response of the heads 120, 152, 154, 156 can be monitored. In another preferred embodiment, the servo circuit 148 is utilized to detect degradations in readback signal amplitude. Referring to FIG. 13, shown therein is an AMPLITUDE DETECTION USING TRACK ADDRESS THRESHOLDS routine 360, representative of steps carried out by the control processor 132 (FIG. 2) and the servo DSP 272 (FIG. 8) for each of the heads 120, 152, 154, 156 in turn.

As indicated by block 362 of FIG. 13, the selected head is first positioned over a selected track. As discussed above, the selected track will have an associated unique track address stored in the Gray code (GC) fields 250 of the selected track. Once so positioned, as shown by block 364 the control processor 132 next instructs the DSP 272 to temporarily ignore indications that the head is no longer positioned over the selected track in response to errors obtained as the track address fields are read. As a result, the DSP 272 will not apply current to the coil driver 274 in an effort to move the head back "on-track" due to erroneous track address indications.

Figure 14:
FIG. 14 provides a graphical illustration of a readback signal of track address information and associated detection thresholds, used during the implementation of the routine of FIG. 13.

The DSP 272 next causes the track address fields 250 of the selected track to be read while sequentially varying amplitude detection thresholds used to detect peaks in the track address signals obtained from the track address fields, as indicated by block 366. Reference is made to FIG. 14, which generally illustrates this process.

More particularly, FIG. 14 shows a graphical representation of a track address signal 370 plotted against an x-axis 372 indicative of elapsed time and a y-axis 374 indicative of signal amplitude. As will be recognized, during normal operation of the servo circuit 148 (FIG. 8) peak detection thresholds (such as at 376, 378) are applied by the level comparator 262 to detect positive and negative peaks (such as those indicated at 380, 382) in the track address signal 370. As discussed above, the thresholds 376, 378 are selected by the DSP 272 and output by the detection level circuit 264 to the level comparator 262 (through the D/A 266).

Accordingly, during the operation of block 366 of FIG. 13 the DSP 272 sequentially varies the detection thresholds 376, 378 while reading a selected number of the track address fields 250 from the selected track for each set of detection thresholds. The number of track address misdetections is accumulated for each set of detection thresholds, block 384, after which the maximum detection thresholds that minimize the occurrence of track address misdetections are identified, block 386.

These maximum detection thresholds will be generally indicative of the peak-to-peak amplitude range response of the head and can be utilized as the baseline and subsequent levels of blocks 282, 284 of FIG. 9. Of course, the gain used by the VGA 254 of the servo circuit 148 (FIG. 8) should be maintained at a constant level during the operation of blocks 366 and 384, to allow the drive 100 to properly differentiate among the effects of the various detection thresholds. Once the maximum detection thresholds are identified at block 386, the detection thresholds are reset to their original settings (for normal operation of the drive) and off-track detection capabilities are enabled at block 388 and the routine ends at 390.

Head Readback Asymmetry Degradation

Figure 15:
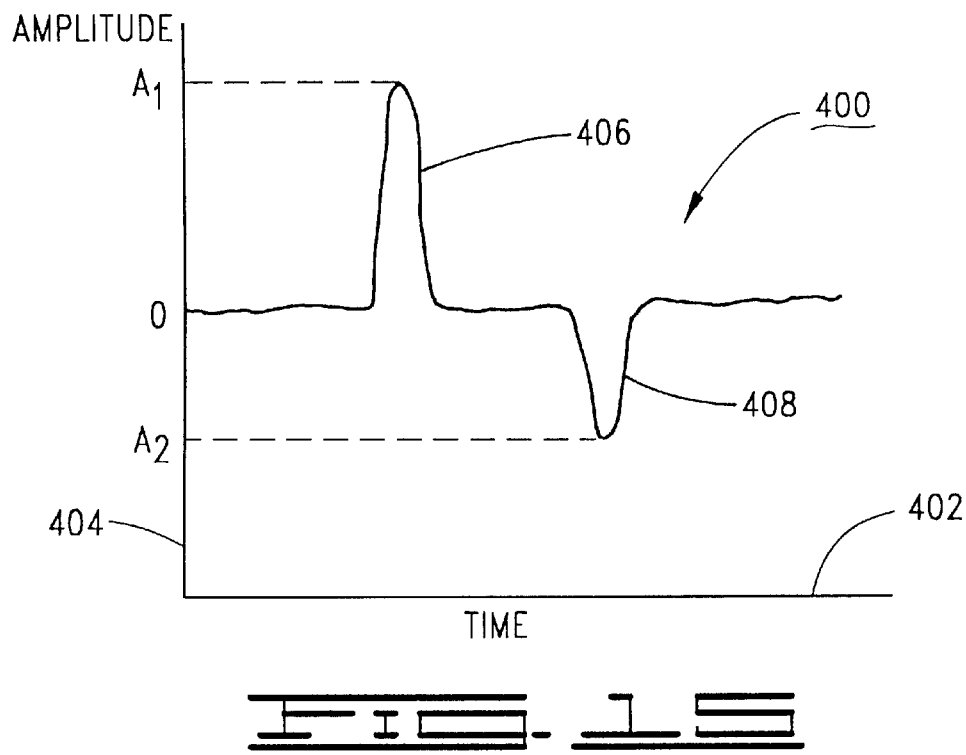
FIG. 15 provides a graphical illustration of a readback signal, showing an example of asymmetry in a head readback signal.

Another head readback response characteristic that can be advantageously monitored to predict future failure of the heads 120, 152, 154, 156 is degradation in head readback asymmetry. As discussed above, readback asymmetry is a ratio of the peak amplitude of positive going pulses to the peak amplitude of negative going pulses. By way of example, a readback signal having substantial amounts of signal asymmetry is shown at 400 in FIG. 15, which plots the readback signal against an x-axis 402 indicative of elapsed time and a y-axis 404 indicative of signal amplitude. As can be seen in FIG. 15, a positive pulse 406 has an amplitude $A_1$ and a negative pulse 408 has an amplitude $A_2$, with $A_1 > A_2$. The readback asymmetry in this example can thus be expressed as the ratio $A_1:A_2$.

In drives employing asymmetry detection and correction (such as the asymmetry control circuit 230 of FIG. 5), control signals applied to the VGA (208, FIG. 5) to compensate detected signal asymmetry can be monitored to detect degradation in signal asymmetry, in accordance with the routine of FIG. 9 above.

Alternatively, detection thresholds used for servo Gray code (track address information, field 250 of FIG. 7) can also be evaluated to detect such asymmetry. This can be accomplished through the operation of the aforementioned AMPLITUDE DETECTION USING TRACK ADDRESS THRESHOLDS routine of FIG. 13, modified to independently vary the detection thresholds 376, 378 of FIG. 14 to arrive at respective maximum positive and negative detection thresholds which are initially determined at block 282 and subsequently determined at block 284 of FIG. 9.

MR Head Nonlinearity Degradation

Still another head readback response characteristic that can be advantageously monitored to predict future failure of the heads 120, 152, 154, 156 is degradation in MR head nonlinearity performance. As will be recognized, MR heads can provide substantial even-order distortion at pulse transitions because of nonlinearities in magnetic flux v. electrical resistance response. This nonlinear response sometimes appears as "shouldering," as illustrated in FIG. 16.

Figure 16:
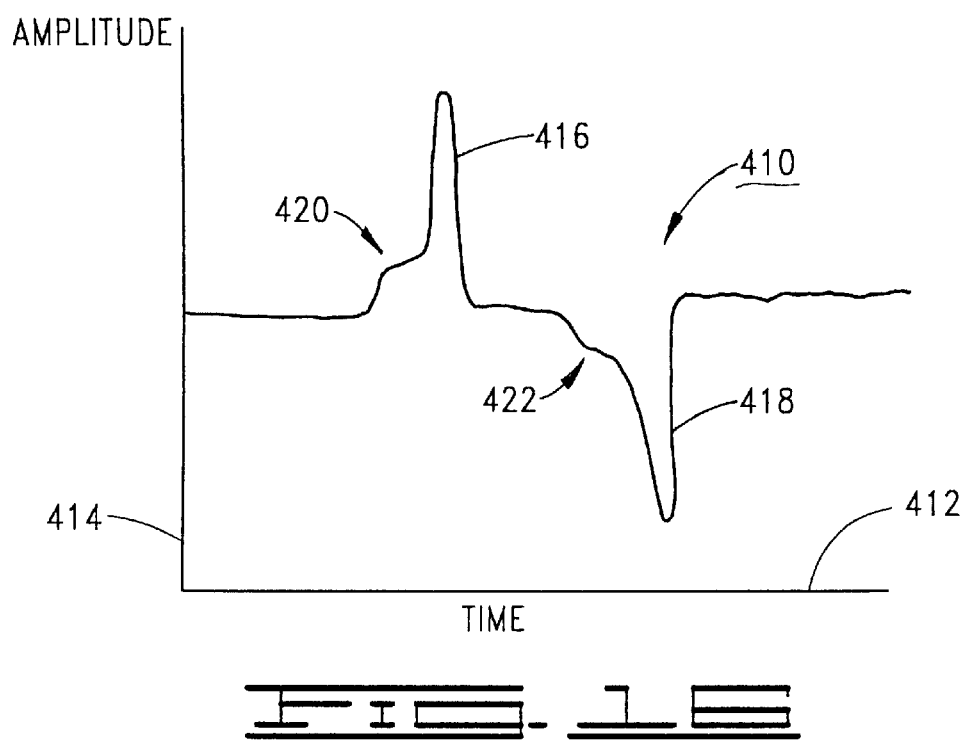
FIG. 16 provides a graphical illustration of a readback signal, showing an example of nonlinearity in a head readback signal.

More particularly, FIG. 16 shows a graphical representation of such an MR head readback signal 410 with significant amounts of shouldering. The signal 410, plotted against a time x-axis 412 and an amplitude y-axis 414, includes a positive pulse 416 and a negative pulse 418, with shoulder portions at 420, 422 respectively. Such shouldering effects can degrade the ability of the read channel 200 and the servo circuit 148 to properly detect data stored on the discs 106, 150.

Some types of commercially available read channels allow compensation of head readback asymmetry by allowing a selectable amount of higher-order compensation in the transfer function response of the VGA (such as VGA 208 in FIG. 5). A typical VGA transfer function response can be as follows:

$$VGA_{OUT} = A(V_{IN} + CV^2_{IN}) \quad (3)$$

where $VGA_{OUT}$ is the amplitude of the output signal from the VGA 208, $V_{IN}$ is the amplitude of the input signal to the VGA 208, A is the gain supplied to the VGA 208 by the AGC circuit 210 (FIG. 5) and C is a selectable constant term which controls the amount of nonlinearity cancellation provided by the VGA 208.

The constant C can be selected in accordance with a NONLINEARITY COMPENSATION routine 430 of FIG. 17, representative of steps carried out by the read channel 200 in accordance with a preferred embodiment to evaluate and compensate the amount of nonlinearity from each head 120, 152, 154, 156.

As shown at block 432, an initial value for the nonlinear compensation term C is selected and applied by the VGA 208. The amount of nonlinearity is next measured by generating an error signal in relation to the sliced and digitized outputs of the FIR 216 while reading appropriate test data (such as the aforementioned 6T pattern on the constant frequency data track), at block 434. This error signal is next integrated and added to the term C to update the VGA response, block 436. The process continues until the error signal is minimized, decision block 438. The resulting term C is then stored for subsequent use by the drive at block 440, after which the routine ends at block 442. Accordingly, the routine of FIG. 17 can be performed as required to provide the baseline and subsequent levels of blocks 282, 284 of FIG. 9, facilitating failure prediction and identification in accordance with the foregoing discussion.

In another preferred embodiment, nonlinearity is evaluated as a function of changes in VGA gain as each head 120, 152, 154, 156 is swept across a selected, corresponding track on the discs 106, 150. To illustrate this effect, reference is made to FIG. 18, which shows a nominally linear position error signal (PES) 450 plotted against a position x-axis 452 and an amplitude y-axis 454. The PES 450 is generated from the position fields 252 (FIG. 7) by the servo circuit 148 and used to control the position of the heads 120, 152, 154, 156 during track following. The PES 450 increases in a linear fashion from a minimum to a maximum value across each track (i.e., between adjacent track boundaries), with the relative magnitude of the PES 450 indicative of the relative distance between the head and the center of each track. It will be noted that the response for the PES 450 indicates nominally linear response by the associated MR head.

By contrast, FIG. 18 provides a corresponding nonlinear position error signal (PES) 460, likewise plotted against a position x-axis 462 and an amplitude y-axis 464. While the nonlinearity of the PES 460 has been somewhat exaggerated for purposes of the present discussion, it is contemplated that the nonlinear response of the associated head is a primary contributor to the resulting nonlinear characteristics of the PES 460. As the PES 460 is utilized by the servo circuit 148 to control the position of the head, it will be recognized that the exhibited nonlinearities may impede the servo circuit 148 from obtaining optimal positional control.

Accordingly, FIG. 20 illustrates a NONLINEARITY DETECTION routine 470 indicative of programming used by the DSP 272 of the servo circuit 148 (FIG. 8) in accordance with a preferred embodiment to assess the amount of nonlinearity associated with each head (120, 152, 154, 156). The routine of FIG. 20 can be performed independently of, or in conjunction with, higher-order nonlinearity compensation available from the VGA 254 of the servo circuit 148.

As shown at block 472, the head is first positioned at a selected track boundary. Once so positioned, the head is incrementally moved to fixed positions across the track width (such as 1/8 track intervals) while the gain utilized by the VGA 208 is monitored, block 474. That is, the AGC circuit 216 operates to adjust the gain of the VGA 208 to optimum settings for each position across the track. A resulting gain profile comprising the gains used by the VGA 208 at each position will then be obtained, with the gain profile correlated to nonlinear characteristics of the selected head. This gain profile is stored, block 476, and the routine ends at 478.

The routine of FIG. 20 can be performed to obtain the baseline and subsequent levels of blocks 282, 284 of FIG. 9, with changes in the gain profile being empirically correlated to head degradation, allowing early detection of possible head failure and appropriate corrective action.

From the foregoing discussion it will now be recognized that the present invention provides an apparatus and method for predicting disc drive failure. As exemplified by the foregoing preferred embodiments, a disc drive (100) includes a controllably positionable head (120, 152, 154, 156) adjacent a rotatable storage disc (106, 150) for reading data from the disc, the head comprising a magneto-resistive element (168) having a changed electrical resistance in the presence of a magnetic field of selected orientation. The disc drive further comprises a read/write channel (142) operably coupled to the head which transfers data between the disc and a host device (130) associated with the disc drive; a servo circuit (148) operably coupled to the head which controls the position of the head relative to the disc; and a control processor (132) operably coupled to the read/write channel and the servo circuit which provides top level control of the disc drive.

In predicting failure of the disc drive, the drive determines and stores a baseline level for a readback response characteristic of the head indicative of head performance as data are read back from the disc (block 282 of FIG. 9). The drive next periodically determines a subsequent level for the readback response characteristic of the head (block 284 of FIG. 9). The drive predicts a possibility of a future failure of the disc drive in relation to a difference between the baseline level and the subsequent level for the readback response characteristic of the head (block 286 of FIG. 9). The drive then provides an indication of the possibility of the future failure to allow a host device (such as 130, FIG. 2) with which the disc drive is associated to reallocate data stored on the disc before the failure of the disc drive (as set forth by block 288, FIG. 9).

In one preferred embodiment, the readback response characteristic comprises an electrical resistance of the head.

Preferred approaches to predicting disc drive failure based on head resistance degradation include selecting a read bias current value and positioning the head sufficiently away from data stored on the disc so that the data do not affect the electrical resistance of the magneto-resistive element (block 302, FIG. 10); measuring a voltage across the magneto-resistive element while applying the read bias current to the magneto-resistive element (blocks 304, 334, FIG. 10); determining the electrical resistance of the magneto-resistive element in relation to the voltage measured across the magneto-resistive element and the read bias current applied to the magneto-resistive element, and storing the electrical resistance and the applied read bias current (blocks 338, 340 of FIG. 10).

In another preferred embodiment, the readback response characteristic comprises amplitude response of the head, determined as a function of a range between maximum and minimum voltage peaks in a readback signal generated by the head as data are read from the disc.

One preferred approach to detecting amplitude response degradation involves monitoring gain used by a variable gain amplifier (208, FIG. 5). Steps include positioning the head over a track on the disc having stored data arranged in a constant frequency data pattern (block 352, FIG. 12); reading the constant frequency data pattern (block 354); selecting a gain for a variable gain amplifier that provides optimum response by the read channel in decoding data from the disc, the gain indicative of the amplitude response of the head (block 356, FIG. 5); and storing the gain (block 356, FIG. 5).

Another preferred approach to detecting amplitude response degradation evaluates track address detection thresholds of the servo circuit, the detection thresholds used to decode track address information. Steps include positioning the head over a selected track (block 362, FIG. 13); instructing the servo circuit to temporarily ignore indications that the head is no longer positioned over the selected track in response to errors obtained as the track address fields are read (block 364); reading the track address fields while sequentially varying amplitude detection thresholds used to detect peaks in a track address signal (block 366); and identifying maximum amplitude detection thresholds which minimize the occurrence of errors obtained as the track address fields are read (blocks 384, 386, FIG. 13).

In another preferred embodiment, the readback response characteristic comprises readback signal asymmetry of the head, characterized as a ratio between absolute magnitudes of positive and negative voltage peaks in a readback signal generated by the head as data are read from the disc.

In a preferred approach, readback signal asymmetry degradation is evaluated by positioning the head over a selected track (block 362, FIG. 13); instructing the servo circuit to temporarily ignore indications that the head is no longer positioned over the selected track in response to errors obtained as the track address fields are read (block 364); reading the track address fields while sequentially, independently varying positive and negative amplitude detection thresholds used to detect peaks in a track address signal (block 366); and identifying maximum positive and negative amplitude detection thresholds which minimize the occurrence of errors obtained as the track address fields are read (blocks 384, 386, FIG. 13).

In yet another preferred embodiment, the readback response characteristic of the head comprises readback signal nonlinearity of the head, characterized as high-order signal response at peak transitions in the readback signal.

In one preferred approach, the variable gain amplifier is provided with a transfer function response in accordance with the relationship $VGA_{OUT}=A[VGA_{IN}+(C)VGA_{IN}^2]$ with $VGA_{OUT}$ an output signal of the variable gain amplifier, $VGA_{IN}$ an input signal applied to the variable gain amplifier, A the gain for the variable gain amplifier and C a compensation term selected to minimize nonlinearity. Steps include selecting an initial value for C (block 432, FIG. 17); measuring an error signal indicative of nonlinearity error (block 434, FIG. 17); integrating the error signal and adding the integrated error signal to C (block 436, FIG. 17); repeating until an optimal value for C is obtained which minimizes the nonlinearity error (block 438, FIG. 17); and storing the optimal value for C (block 442, FIG. 17).

In another preferred approach, steps to evaluate head readback nonlinearity include positioning the head at a boundary of a track having a width (block 472, FIG. 20); monitoring the gain of the variable gain amplifier as the head is controllably positioned at selected intervals across the width of the track to establish a gain profile (block 474, FIG. 20); and storing the gain profile (block 476, FIG. 20).

For purposes of the following claims, it will be understood that the term "bias current" comprises a current that is applied to a head to facilitate the operation of the head, such as the read bias current discussed hereinabove with respect to magneto-resistive heads. However, other types of heads utilizing bias currents, such as giant magneto-resistive (GMR), spin valve heads, and the like are also contemplated as being readily within the spirit and scope of the claimed invention. Further, the use of the term "circuit" will be readily understood to cover both hardware and firmware implementations, such as with a programmable processor (i.e., the control processor 132) disclosed herein. Finally, it will be understood that although certain method claims show an ordering of steps, the scope of the claims are not necessarily limited to the ordering of the steps presented therein.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for predicting failure of a disc drive of the type having a controllably positionable head adjacent a rotatable storage disc for reading data from the disc, the head comprising a magneto-resistive element having a changed electrical resistance in the presence of a magnetic field of selected orientation, the method comprising steps of:

(a) determining a baseline level for a readback response characteristic of the head indicative of head performance as data are read back from the disc;

(b) periodically determining a subsequent level for the readback response characteristic of the head;

(c) predicting a possibility of a future failure of the disc drive in relation to a difference between the baseline level and the subsequent level for the readback response characteristic of the head; and (d) providing an indication of the possibility of the future failure to allow a host device with which the disc drive is associated to reallocate data stored on the disc before the failure of the disc drive.

2. The method of claim 1, wherein the determining step (a) is performed during manufacturing of the disc drive and wherein the periodically determining step (b) is performed during subsequent data processing use of the disc drive.

3. The method of claim 1, wherein the periodically determining step (b) is performed a plurality of times to obtain a plurality of subsequent levels for the readback response characteristic of the head, and wherein the predicting step (c) comprises predicting the possibility of the future failure of the disc drive in relation to a rate of increase in the subsequent levels for the readback response characteristic of the head.

4. The method of claim 1, wherein the readback response characteristic of the head comprises an electrical resistance of the magneto-resistive element.

5. The method of claim 4, wherein the determining step (a) comprises steps of:

(a1) selecting a read bias current value;

(a2) positioning the head sufficiently away from data stored on the disc so that the data do not affect the electrical resistance of the magneto-resistive element;

(a3) measuring a voltage across the magneto-resistive element while applying the read bias current to the magneto-resistive element;

(a4) determining a baseline electrical resistance of the magneto-resistive element in relation to the voltage measured across the magneto-resistive element and the read bias current applied to the magneto-resistive element; and (a5) storing the baseline electrical resistance and the applied read bias current.

6. The method of claim 5, wherein the periodically determining step (b) comprises steps of:

(b1) recalling the read bias current stored in step (a5);

(b2) positioning the head sufficiently away fiom data stored on the disc so that the data do not affect the electrical resistance of the magneto-resistive element;

(b3) measuring a voltage across the magneto-resistive element while applying the read bias current to the magneto-resistive element; and (b4) determining a subsequent electrical resistance of the magneto-resistive element in relation to the voltage measured across the magneto-resistive element and the read bias current applied to the magneto-resistive element.

7. The method of claim 6, wherein the predicting step (c) comprises steps of:

(c1) calculating a difference between the baseline electrical resistance determined in step (a4) and the subsequent electrical resistance determined in step (b4);

(c2) comparing the difference to a predetermined threshold; and (c3) setting an error flag when the difference exceeds the predetermined threshold.

8. The method of claim 1, wherein the readback response characteristic of the head comprises amplitude response of the head, determined as a function of a range between maximum and minimum voltage peaks in a readback signal generated by the head as data are read from the disc.

9. The method of claim 8, wherein the disc drive further comprises a read channel operably coupled to the head to decode readback signals generated by the head to return previously stored data to a host device, the read channel comprising a variable gain amplifier which utilizes an adjustable gain to set an amplified range of the readback signal to an optimum level for subsequent processing by the read channel, and wherein the determining step (a) comprises steps of:

(a1) positioning the head over a track on the disc having stored data arranged in a constant frequency data pattern;

(a2) reading the constant frequency data pattern;

(a3) selecting a baseline gain for the variable gain amplifier that provides optimum response by the read channel, the baseline gain indicative of the amplitude response of the head; and (a4) storing the baseline gain.

10. The method of claim 9, wherein the periodically determining step (b) comprises steps of:

(b1) recalling the baseline gain stored in step (a4);

(b2) positioning the head over a track on the disc having stored data arranged in a constant frequency data pattern;

(b3) reading the constant frequency data pattern of step (b2); and (b4) selecting a subsequent gain for the variable gain amplifier that provides optimum response by the read channel, the baseline gain indicative of the amplitude response of the head.

11. The method of claim 10, wherein the predicting step (c) comprises steps of:

(c1) calculating a difference between the baseline gain determined in step (a3) and the subsequent gain determined in step (b4);

(c2) comparing the difference to a predetermined threshold; and (c3) setting an error flag when the difference exceeds the predetermined threshold.

12. The method of claim 8, wherein the disc drive further comprises a servo circuit operably coupled to the head which controls the position of the head relative to tracks defined on the disc in response to servo information stored on the disc, the servo information including a plurality of track address fields storing a unique track address indicative of a radial position of the track relative to the disc, and wherein the determining step (a) comprises steps of:

(a1) positioning the head over a selected track;

(a2) instructing the servo circuit to temporarily ignore indications that the head is no longer positioned over the selected track in response to errors obtained as the track address fields are read;

(a3) reading the track address fields while sequentially varying amplitude detection thresholds used to detect peaks in a track address signal; and (a4) identifying maximum baseline amplitude detection thresholds which minimize the occurrence of errors obtained as the track address fields are read, the baseline amplitude detection thresholds indicative of the amplitude response of the head.

13. The method of claim 12, wherein the periodically determining step (b) comprises steps of:

(b1) positioning the head over a selected track;

(b2) instructing the servo circuit to temporarily ignore indications that the head is no longer positioned over the selected track in response to errors obtained as the track address fields are read;

(b3) reading the track address fields while sequentially varying amplitude detection thresholds used to detect peaks in a track address signal; and (b4) identifying maximum subsequent amplitude detection thresholds which minimize the occurrence of errors obtained as the track address fields are read.

14. The method of claim 13, wherein the predicting step (c) comprises steps of:

(c1) calculating a difference between the baseline gain determined in step (a3) and the subsequent gain determined in step (b4);

(c2) comparing the difference to a predetermined threshold; and (c3) setting an error flag when the difference exceeds the predetermined threshold.

15. The method of claim 1, wherein the readback response characteristic of the head comprises readback signal asymmetry of the head, characterized as a ratio between absolute magnitudes of positive and negative voltage peaks in a readback signal generated by the head as data are read from the disc.

16. The method of claim 15, wherein the disc drive further comprises a servo circuit operably coupled to the head which controls the position of the head relative to tracks defined on the disc in response to servo information stored on the disc, the servo information including a plurality of track address fields storing a unique track address indicative of a radial position of the track relative to the disc, and wherein the determining step (a) comprises steps of:

(a1) positioning the head over a selected track;

(a2) instructing the servo circuit to temporarily ignore indications that the head is no longer positioned over the selected track in response to errors obtained as the track address fields are read;

(a3) reading the track address fields while sequentially, independently varying positive and negative amplitude detection thresholds used to detect peaks in a track address signal; and (a4) identifying maximum baseline positive and negative amplitude detection thresholds which minimize the occurrence of errors obtained as the track address fields are read, a ratio of the baseline positive and negative amplitude detection thresholds indicative of the asymmetry response of the head.

17. The method of claim 16, wherein the periodically determining step (b) comprises steps of:

(b1) positioning the head over a selected track;

(b2) instructing the servo circuit to temporarily ignore indications that the head is no longer positioned over the selected track in response to errors obtained as the track address fields are read;

(b3) reading the track address fields while sequentially, independently varying positive and negative amplitude detection thresholds used to detect peaks in a track address signal; and (b4) identifying maximum subsequent positive and negative amplitude detection thresholds which minimize the occurrence of errors obtained as the track address fields are read, a ratio of the subsequent positive and negative amplitude detection thresholds indicative of the asymmetry response of the head.

18. The method of claim 17, wherein the predicting step (c) comprises steps of:
   (c1) calculating a difference between the ratio determined in step (a4) and the ratio determined in step (b4);
   (c2) comparing the difference to a predetermined threshold; and
   (c3) setting an error flag when the difference exceeds the predetermined threshold.

19. The method of claim 1, wherein the readback response characteristic of the head comprises readback signal nonlinearity of the head, characterized as high-order signal response at peak transitions in the readback signal.

20. The method of claim 19, wherein the disc drive further comprises a variable gain amplifier which utilizes an adjustable gain to set an amplified range of the readback signal to an optimum level for subsequent processing by the disc drive, and wherein the readback signal nonlinearity is determined in relation to an optimum gain for the variable gain amplifier.

21. The method of claim 20, wherein a transfer function response of the variable gain amplifier is defined in accordance with a relationship $VGA_{OUT}=A[VGA_{IN}+(C)VGA_{IN}^2]$ with $VGA_{OUT}$ an output signal of the variable gain amplifier, $VGA_{IN}$ an input signal applied to the variable gain amplifier, A the gain for the variable gain amplifier and C a compensation term selected to minimize nonlinearity, and wherein steps (a) and (b) further comprise steps of:
   (1) selecting an initial value for C;
   (2) measuring an error signal indicative of nonlinearity error;
   (3) integrating the error signal;
   (4) adding the integrated error signal to C;
   (5) repeating steps (2) through (4) until an optimal value for C is obtained which minimizes the nonlinearity error; and
   (6) storing the optimal value for C.

22. The method of claim 20, wherein the variable gain amplifier is used by a servo circuit of the disc drive to set an amplified range for readback signals from servo information stored on the disc, and wherein steps (a) and (b) further comprise steps of:
   (1) positioning the head at a boundary of a track having a width;
   (2) monitoring the gain of the variable gain amplifier as the head is controllably positioned at selected intervals across the width of the track to establish a gain profile; and
   (3) storing the gain profile.

23. A disc drive, comprising:
   a rotatable disc on which data are stored and retrieved by a head adjacent the disc;
   a read/write channel operably coupled to the head which transfers data between the disc and a host device associated with the disc drive;
   a servo circuit operably coupled to the head which controls the position of the head relative to the disc; and
   a control processor operably coupled to the read/write channel and the servo circuit having associated programming to:
   (a) determine a baseline level for a readback response characteristic of the head indicative of head performance as data are read back from the disc;
   (b) periodically determine a subsequent level for the readback response characteristic of the head;
   (c) predict a possibility of a future failure of the disc drive in relation to a difference between the baseline level and the subsequent level for the readback response characteristic of the head; and
   (d) provide an indication of the possibility of the future failure to allow a host device with which the disc drive is associated to reallocate data stored on the disc before the failure of the disc drive.

24. The disc drive of claim 23, wherein the baseline level for the readback response characteristic of the head is determined during manufacturing of the disc drive and wherein the subsequent level for the readback response characteristic of the head is determined during subsequent data processing use of the disc drive.

25. The disc drive of claim 23, wherein a plurality of subsequent levels for the readback response characteristic of the head are determined and wherein the possibility of future failure is predicted in relation to a rate of increase in the subsequent levels for the readback response characteristic of the head.

26. The disc drive of claim 23, wherein the readback response characteristic of the head comprises an electrical resistance of the magneto-resistive element.

27. The disc drive of claim 23, wherein the readback response characteristic of the head comprises amplitude response of the head, determined as a function of a range between maximum and minimum voltage peaks in a readback signal generated by the head as data are read from the disc.

28. The disc drive of claim 23, wherein the readback response characteristic of the head comprises readback signal asymmetry of the head, characterized as a ratio between absolute magnitudes of positive and negative voltage peaks in a readback signal generated by the head as data are read from the disc.

29. The disc drive of claim 23, wherein the readback response characteristic of the head comprises readback signal nonlinearity of the head, characterized as high-order signal response at peak transitions in the readback signal.

30. The disc drive of claim 23, wherein the disc drive further comprises a variable gain amplifier which utilizes an adjustable gain to set an amplified range of the readback signal to an optimum level for subsequent processing by the disc drive, and wherein the readback signal nonlinearity is determined in relation to an optimum gain for the variable gain amplifier.

31. A disc drive, comprising:
   a head controllably positionable adjacent a rotatable disc; and
   means, responsive to the head, for detecting degradation in readback performance of the head and for predicting a possibility of future disc drive failure in response to the detected degradation, and for providing an indication of the possibility of future failure to a host device to allow reallocation of data stored on the disc before failure of the disc drive.

32. The disc drive of claim 31, wherein the readback performance of the head comprises an electrical resistance of the head.

33. The disc drive of claim 31, wherein the readback performance of the head comprises amplitude response of the head.

34. The disc drive of claim 31, wherein the readback performance of the head comprises readback signal asymmetry of the head.

35. The disc drive of claim 31, wherein the readback performance of the head comprises readback signal nonlinearity of the head.

* * * * *